(12) United States Patent
Concklin

(10) Patent No.: US 12,249,911 B2
(45) Date of Patent: Mar. 11, 2025

(54) FLYING CAPACITOR STARTUP CIRCUIT FOR MULTI-LEVEL VOLTAGE CONVERTER

(71) Applicant: Renesas Electronics America Inc., Milpitas, CA (US)

(72) Inventor: Barry John Concklin, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 308 days.

(21) Appl. No.: 18/156,766

(22) Filed: Jan. 19, 2023

(65) Prior Publication Data
US 2024/0250609 A1    Jul. 25, 2024

(51) Int. Cl.
| | |
|---|---|
| H02M 3/00 | (2006.01) |
| H02M 1/00 | (2006.01) |
| H02M 1/36 | (2007.01) |
| H02M 3/07 | (2006.01) |

(52) U.S. Cl.
CPC ........... H02M 3/07 (2013.01); H02M 1/0095 (2021.05); H02M 1/36 (2013.01)

(58) Field of Classification Search
CPC ........ H02M 3/07; H02M 1/0095; H02M 1/36; H02M 1/0003
See application file for complete search history.

(56) References Cited

U.S. PATENT DOCUMENTS

| | | | | |
|---|---|---|---|---|
| 10,468,978 | B2 * | 11/2019 | Zhang | .................... H02M 3/073 |
| 2022/0368337 | A1 * | 11/2022 | Cho | .................... H03M 1/0617 |
| 2023/0216409 | A1 * | 7/2023 | Ravi | .................... H02M 1/0025 |
| | | | | 323/282 |

* cited by examiner

*Primary Examiner* — Adolf D Berhane
*Assistant Examiner* — Afework S Demisse
(74) *Attorney, Agent, or Firm* — SCULLY, SCOTT, MURPHY & PRESSER, P.C.

(57) ABSTRACT

Apparatuses, devices, and methods for operating a multi-level voltage converter are described. A semiconductor device can include a circuit, where the circuit can include a plurality of current sources. The circuit can be configured to measure a flying capacitor voltage across a flying capacitor of a multi-level voltage converter. The circuit can be further configured to compare the flying capacitor voltage with a voltage level equivalent to an intermediate voltage that is between ground and an input voltage being provided to the multi-level voltage converter. The circuit can be further configured to, based on a result of the comparison, switch a current source among the plurality of current sources to maintain the flying capacitor voltage at the intermediate voltage.

20 Claims, 19 Drawing Sheets

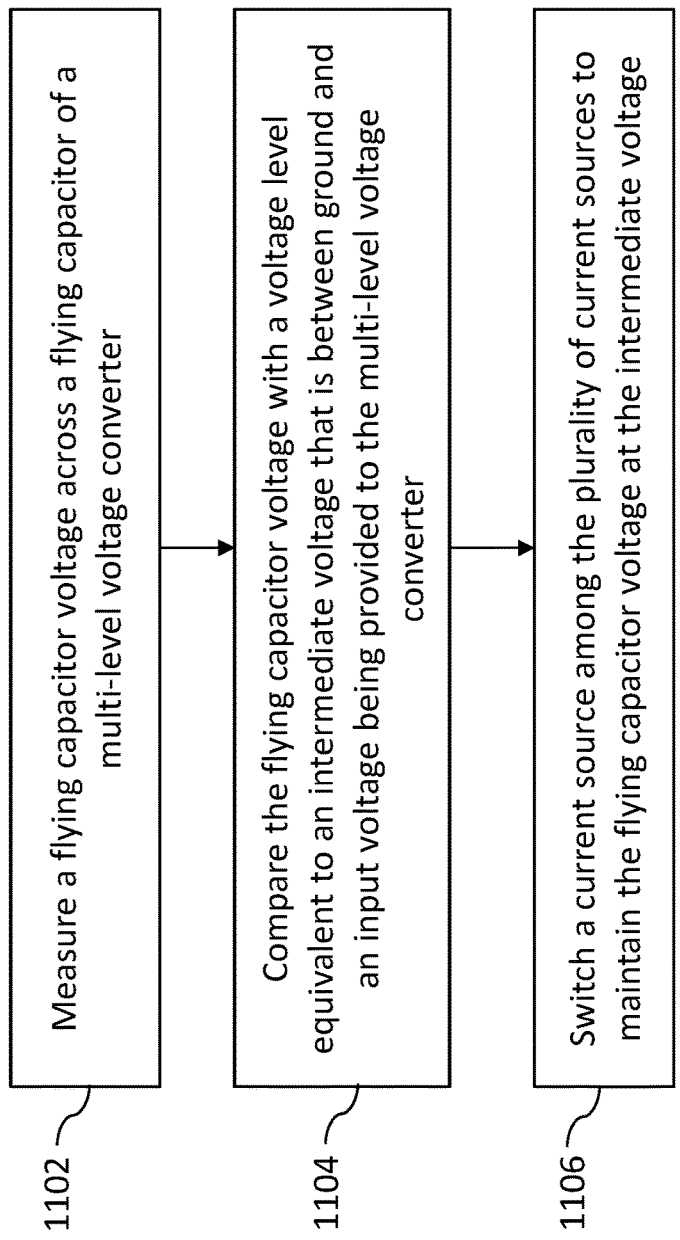

FLYING CAPACITOR STARTUP CIRCUIT FOR MULTI-LEVEL VOLTAGE CONVERTER

BACKGROUND

The present disclosure relates in general to semiconductor devices. More specifically, the present disclosure relates to a flying capacitor startup circuit for multi-level voltage converters.

Voltage converters, such as buck converters and boost converters, can be used for converting an input voltage to an output voltage having a different voltage level. A buck converter, or step-down converter, can be used in applications where there is a need to decrease a direct current (DC) voltage. The buck converter can receive an input voltage and provide a stepped-down output voltage. A boost converter, or step-up converter, can be used in applications where there is a need to increase a DC voltage. The boost converter can receive an input voltage and provide a stepped-up output voltage. A voltage converter can include multiple switches at an input of the voltage converter, where the switches can be turned on and off by a pulse width modulated (PWM) control signal. A duty cycle of the PWM control signal can determine an output voltage of the voltage converter. As the switches turn on and off, they modulate a DC input voltage and the modulated voltage can be provided to an inductor. The inductor can be connected to a capacitor and the modulated voltage can be a time-varying voltage that causes the inductor to create a time-varying current. The interaction of the inductor and capacitor with the time-varying voltage and current can produce a nearly constant output voltage that has a different DC level than the input voltage.

A voltage converter with two switches can switch the inductor between two voltages—the input voltage and ground. A multi-level voltage converter can include more than two switches and can switch the inductor among more than two voltages—the input voltage, at least one intermediate voltage between the input voltage and ground, and ground. For example, a three-level voltage converter can include four switches and can switch the inductor among three voltages—the input voltage, a mid-voltage equivalent to half the input voltage, and ground. Multi-level voltage converters include at least one flying capacitor that is switched between two states—a charging state and a discharging state.

SUMMARY

In one embodiment, a semiconductor is generally described. The semiconductor device can include a circuit. The circuit can include a plurality of current sources. The circuit can be configured to measure a flying capacitor voltage across a flying capacitor of a multi-level voltage converter. The circuit can be further configured to compare the flying capacitor voltage with a voltage level equivalent to an intermediate voltage that is between ground and an input voltage being provided to the multi-level voltage converter. The circuit can be further configured to, based on a result of the comparison, switch a current source among the plurality of current sources to maintain the flying capacitor voltage at the intermediate voltage.

In one embodiment, a system is generally described. The system can include a multi-level voltage converter and a circuit. The multi-level voltage converter can include a flying capacitor and a plurality of transistors. The circuit can include a plurality of current sources. The circuit can be configured to measure a flying capacitor voltage across a flying capacitor of a multi-level voltage converter. The circuit can be further configured to compare the flying capacitor voltage with a voltage level equivalent to an intermediate voltage that is between ground and an input voltage being provided to the multi-level voltage converter. The circuit can be further configured to, based on a result of the comparison, switch a current source among the plurality of current sources to maintain the flying capacitor voltage at the intermediate voltage.

In one embodiment, a method for operating a multi-level voltage converter is generally described. The method can include measuring a flying capacitor voltage across a flying capacitor of a multi-level voltage converter. The method can further include comparing the flying capacitor voltage with a voltage level equivalent to an intermediate voltage that is between ground and an input voltage being provided to the multi-level voltage converter. The method can further include, based on a result of the comparison, switching a current source among the plurality of current sources to maintain the flying capacitor voltage at the intermediate voltage.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 11 is a flow diagram illustrating a process to implement a flying capacitor startup circuit for multi-level voltage converters in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1A:
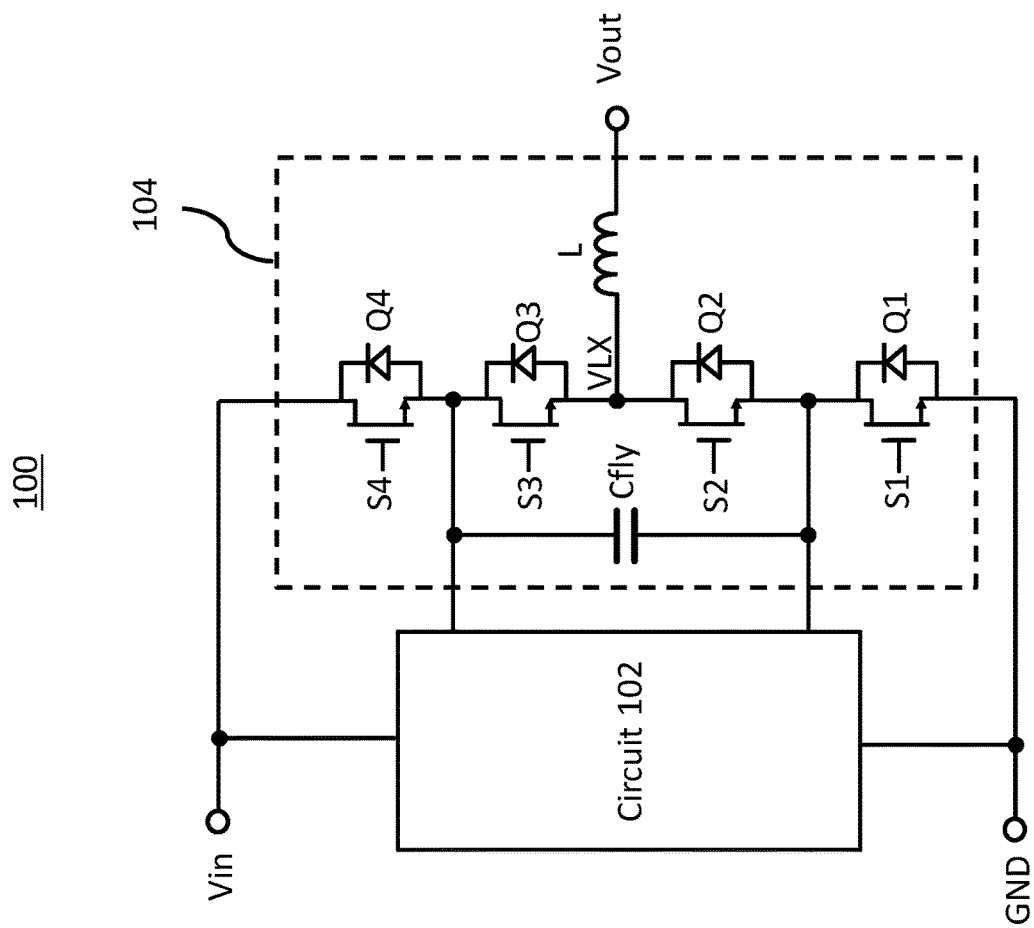
FIG. 1A is an example diagram of an apparatus that includes flying capacitor startup circuit for multi-level voltage converters in one embodiment.
Figure 1B:
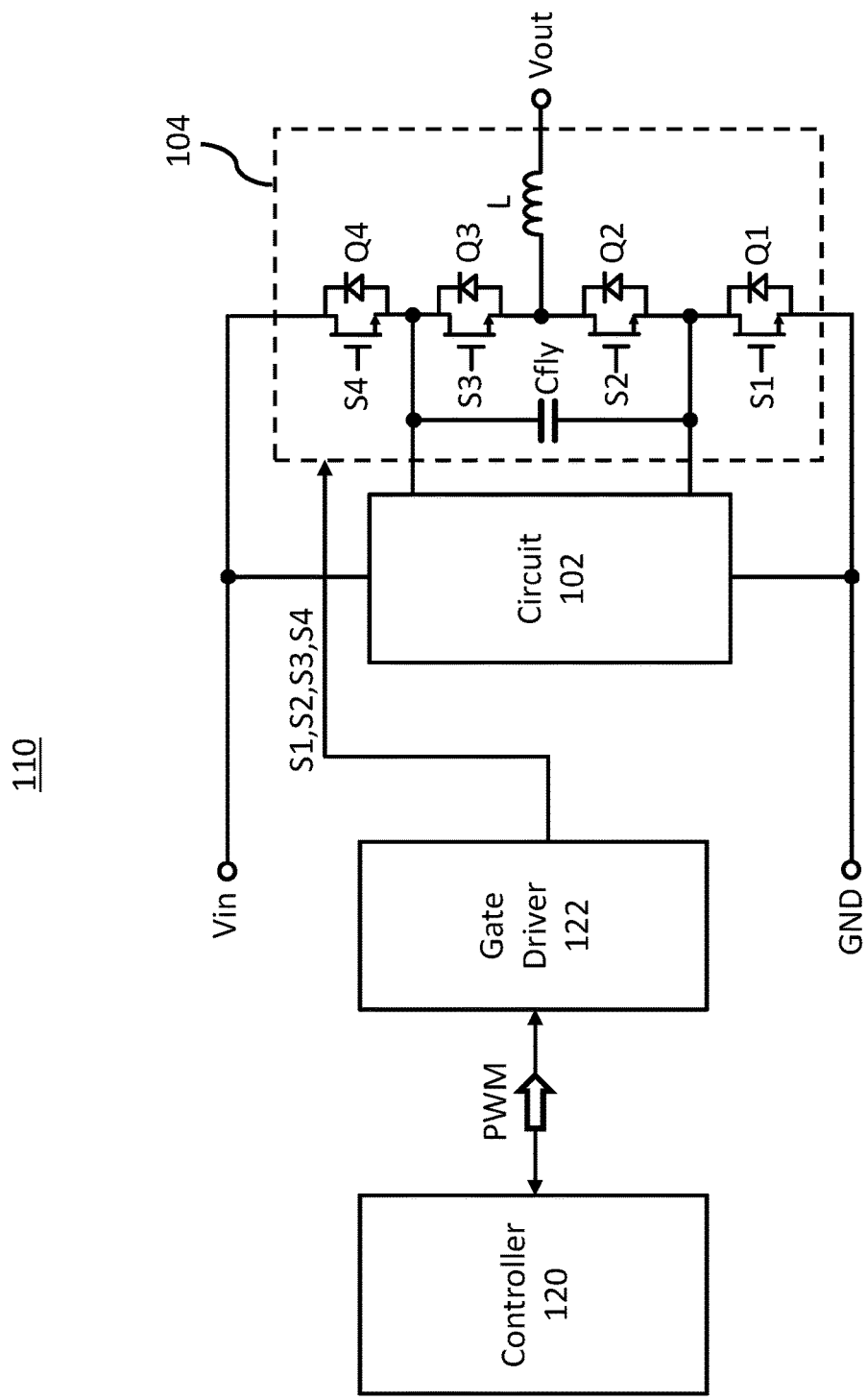
FIG. 1B is an example diagram of a system that can implement a flying capacitor startup circuit for multi-level voltage converters in one embodiment.
Figure 1C:
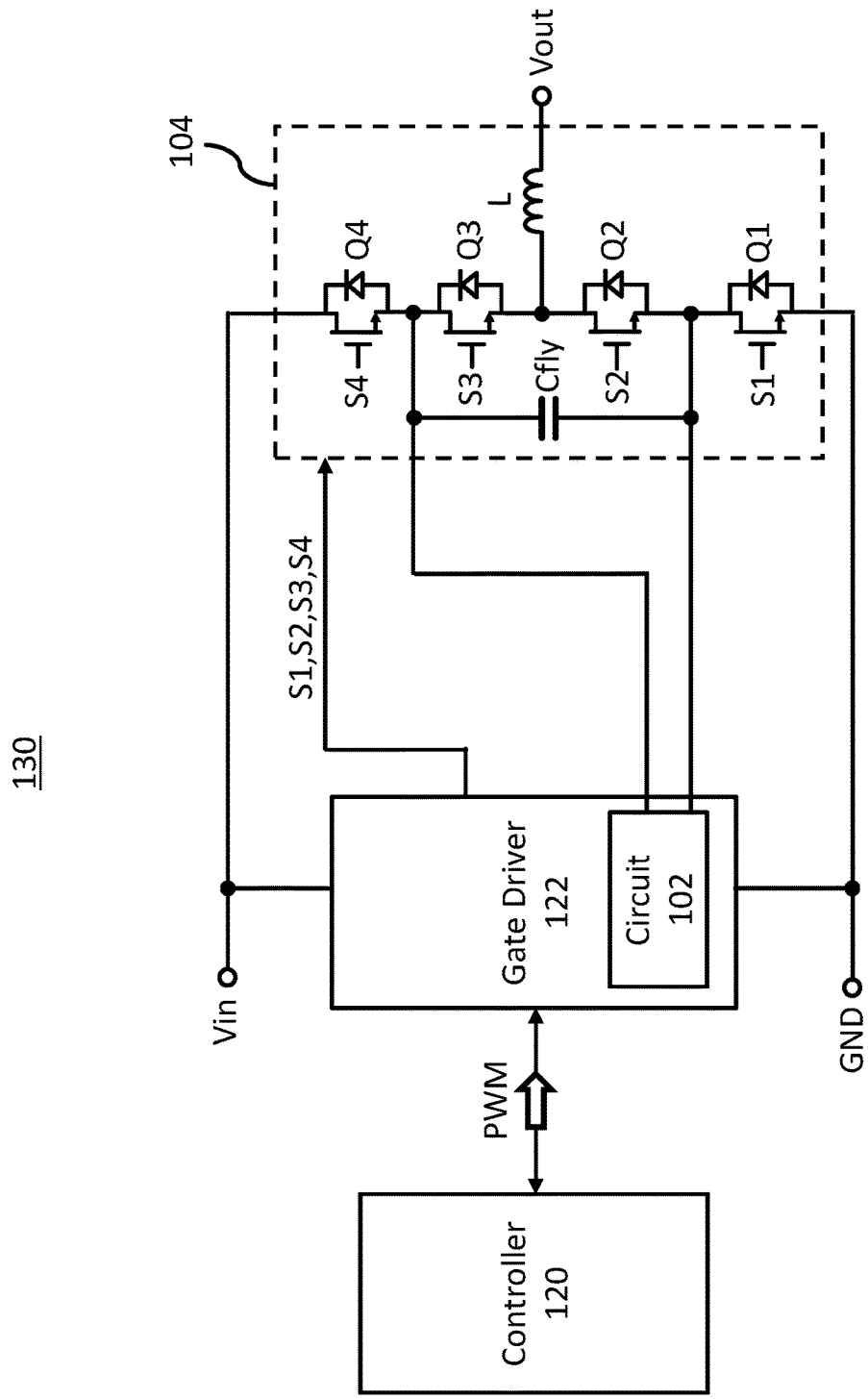
FIG. 1C is an example diagram of a system that can implement a flying capacitor startup circuit for multi-level voltage converters in one embodiment.

FIG. 1A is an example diagram of an apparatus that includes flying capacitor startup circuit for multi-level voltage converters in one embodiment. An apparatus 100 is shown in FIG. 1. Apparatus 100 can be, for example, a semiconductor device implementing a voltage regulator that receives an input voltage Vin and output an output voltage Vout. Apparatus 100 can include a circuit 102 and a multi-level voltage converter 104, where multi-level voltage converter 104 can be a three-level buck converter. Multi-level voltage converter 104 can include four transistors Q1, Q2, Q3, Q4, an inductor L, and a flying capacitor Cfly. Transistors Q1, Q4 can be referred to as the outer transistors, and transistors Q2, Q3 can be referred to as inner transistors.

Figure 1D:
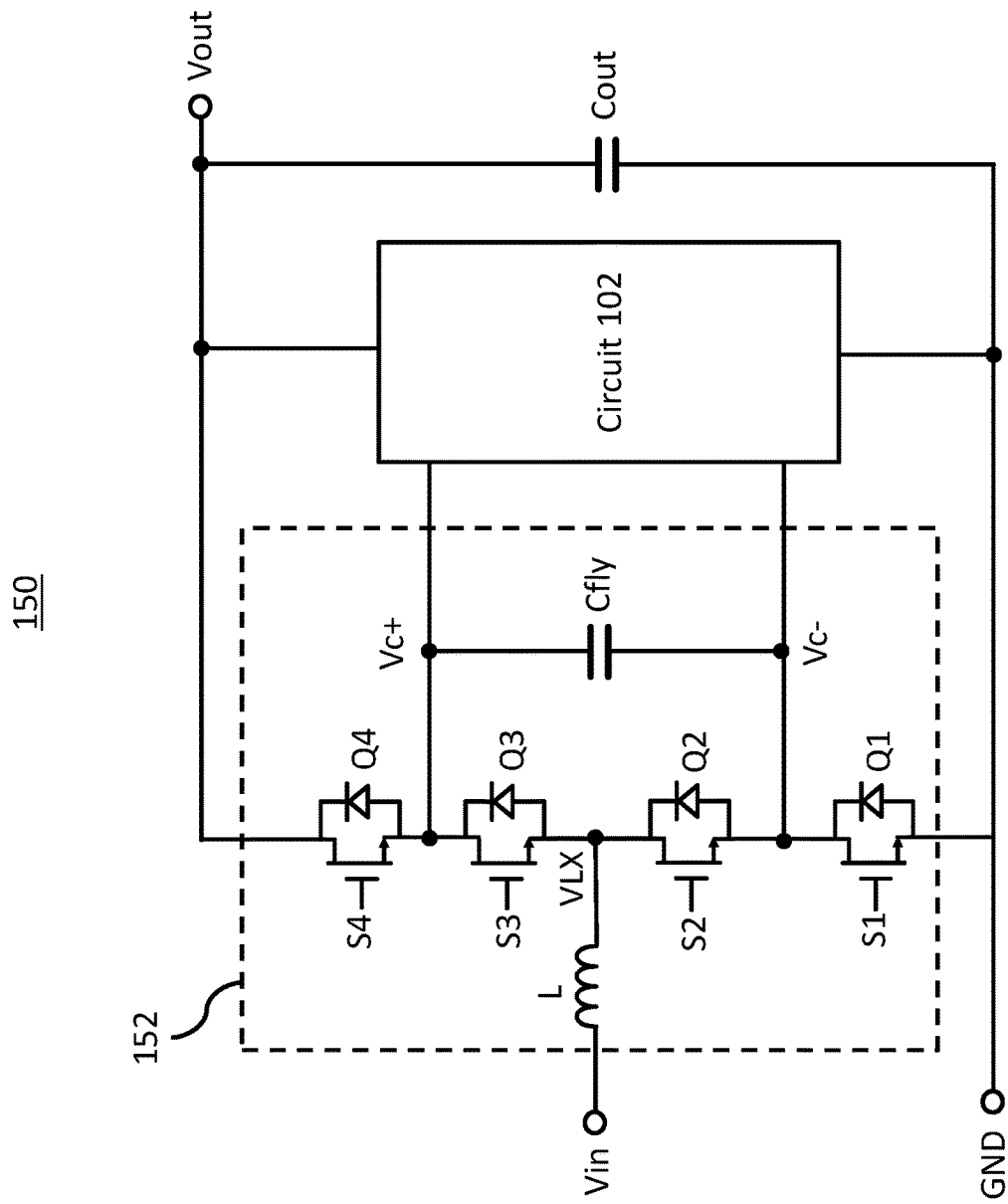
FIG. 1D is an example diagram of another apparatus that includes flying capacitor startup circuit for multi-level voltage converters in one embodiment.
Figure 1E:
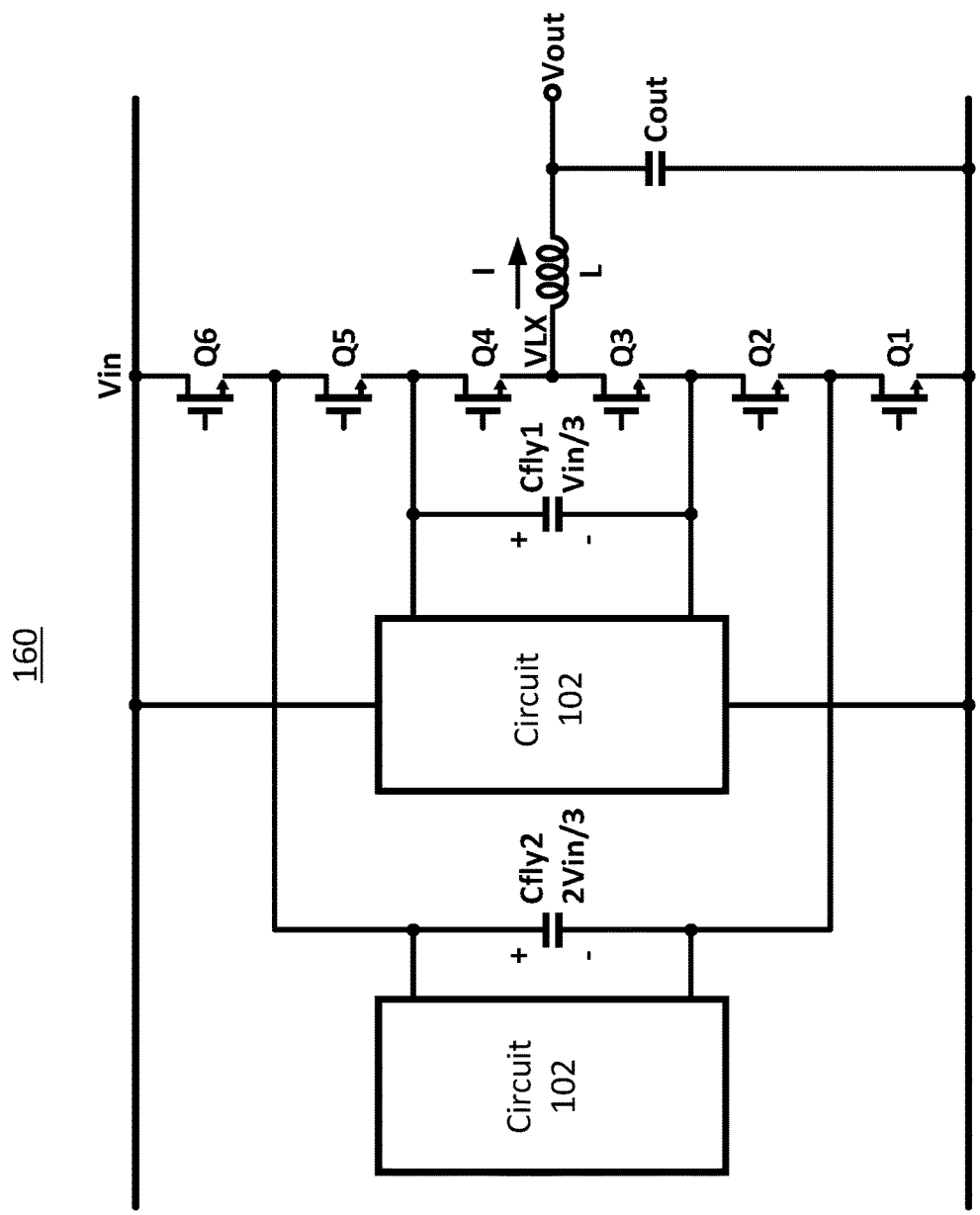
FIG. 1E is an example diagram of another apparatus that includes flying capacitor startup circuit for multi-level voltage converters in one embodiment.
Figure 1F:
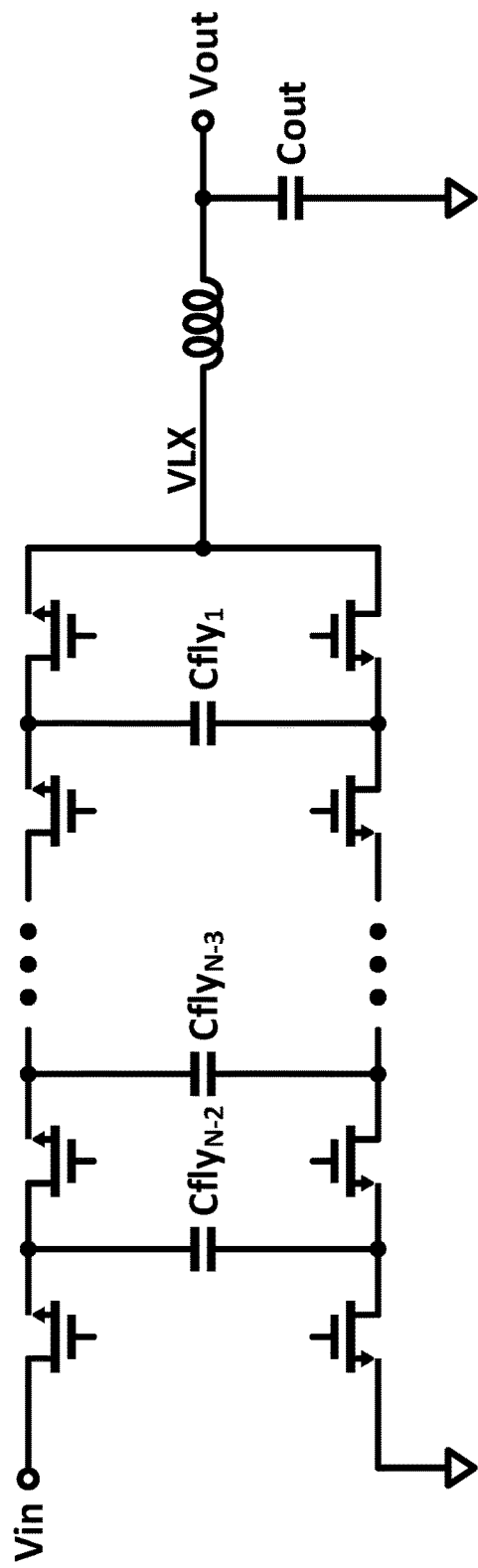
FIG. 1F is an example diagram of another apparatus that can implement a flying capacitor startup circuit for multi-level voltage converters in one embodiment.
Figure 1G:
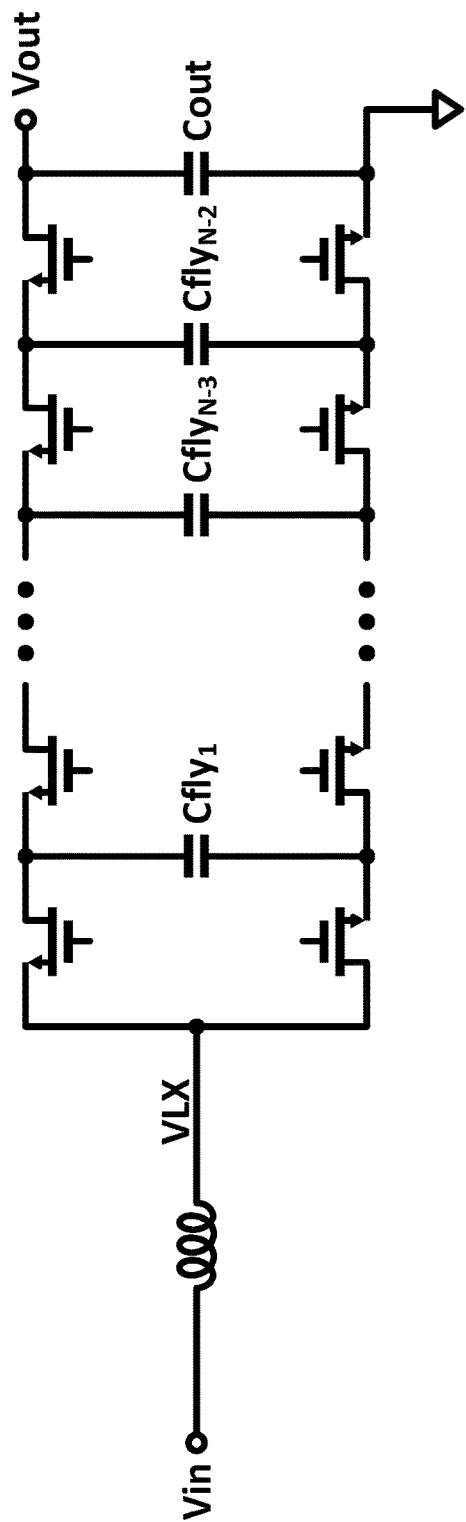
FIG. 1G is an example diagram of another apparatus that can implement a flying capacitor startup circuit for multi-level voltage converters in one embodiment.

In an embodiment shown in FIG. 1D, circuit 102 can also be implemented for an apparatus 150 that includes a multi-level boost converter, such as a three-level boost converter 152. In an embodiment shown in FIG. 1E, more than one circuit 102 can be implemented for an apparatus 160 that includes a four-level boost converter. In an embodiment shown in FIG. 1F, more than one circuit 102 can also be implemented for an apparatus 170 that includes a N-level buck converter. In an embodiment shown in FIG. 1G, more than one circuit 102 can also be implemented for an apparatus 180 that includes a N-level boost converter.

Transistors Q1, Q2, Q3, Q4 can be switched at different timings to generate a desired voltage level and output the desired voltage level as output voltage Vout. In an aspect, a first complementary signal including signals S1, S4 can drive outer transistors Q1, Q4 with a duty cycle D=Vout/Vin. A second complementary signal including signals S2, S3 having equal duty cycle can drive inner transistors Q2, Q3, and the second complementary signal can be phase-shifted from the first complementary signal by 180 degrees. The timing and duty cycle of the first and second complementary signals can maintain a flying capacitor voltage (e.g., a voltage on flying capacitor Cfly) at half the input voltage Vin, such as Vin/2. By maintaining the flying capacitor voltage at Vin/2, voltage at a switch node VLX between inner transistors Q2, Q3 can alternate between Vin, Vin/2, and ground (GND).

Circuit 102 can be a startup circuit configured to initialize and maintain the flying capacitor voltage at a target voltage, where in the case of a three-level voltage converter, the target voltage can be Vin/2. The target voltage being maintain by circuit 102 can be an intermediate voltage that has a voltage level between Vin and ground. In one or more embodiments, more than one copy of circuit 102 can be implemented for N-level voltage converters, and each copy of circuit 102 can maintain an individual flying capacitor at a respective target voltage. As shown by the embodiment in FIG. 1E, one copy of circuit 102 can be implemented to maintain a first flying capacitor Cfly1 at an intermediate voltage Vin/3, and another copy of circuit 102 can be implemented to maintain a second flying capacitor Cfly2 at another intermediate voltage 2 Vin/3.

Circuit 102 can include one or more circuits or circuit blocks configured to perform different tasks or functions of circuit 102. Referring to an embodiment in FIG. 1B, apparatus 100 can be a part of a system 110 that includes apparatus 100, a controller 120 and a gate driver 122. Controller 120 can be configured to provide one or more pulse width modulation (PWM) signals to gate driver 122. Gate driver 122 can be configured to drive transistors Q1, Q2, Q3, Q4 by generating and providing the first and second complementary signals that include signals S1, S2, S3, S4. Generation of the signals S1, S2, S3, S4 can be based on the PWM signals provided by controller 120. In the embodiment shown in FIG. 1B, circuit 102 can be a standalone circuit or hardware component separated from controller 120 and gate driver 122. In another embodiment shown in FIG. 1C, circuit 102 can be a part of gate driver 122.

In an aspect, If the flying capacitor voltage maintained at, or approximately, Vin/2, then the voltage across any one of transistors Q1, Q2, Q3, Q4 can be less than Vin/2. Hence, one of transistors Q1, Q2, Q3, Q4 can be selected with maximum operating voltage near Vin/2. When controller 120 is shut down, multi-level voltage converter 104 is idle and not outputting power, and the flying capacitor voltage is not being maintained at Vin/2. Hence, to startup multi-level voltage converter 104 from an idle state, the flying capacitor voltage needs to reach Vin/2 (either from a charged or discharged state) relatively quickly to avoid overvoltage on transistors Q1, Q2, Q3, Q4.

Circuit 102 can be implemented as a startup circuit to initialize and maintain the flying capacitor voltage at Vin/2 when controller 120 is shut down. By maintaining the flying capacitor voltage at Vin/2 when controller 120 is shut down (and when multi-level voltage converter 104 is idle), overvoltage on transistors Q1, Q2, Q3, Q4 can be prevented for any allowed ramp rate on Vin at startup. Further, circuit 102 may require relatively low current to operate since circuit 102 is enabled when multi-level voltage converter 104 is idle and not outputting power. Further, when circuit 102 is enabled, inner transistors Q2, Q3 can be turned off to disconnect Vout, and current through the body diodes of transistors Q2, Q3 to Vout should be avoided. Furthermore, circuit 102 is implemented as a standalone circuit separated from controller 120 such that circuit 102 can be enabled when controller 120 is shut down.

Figure 2:
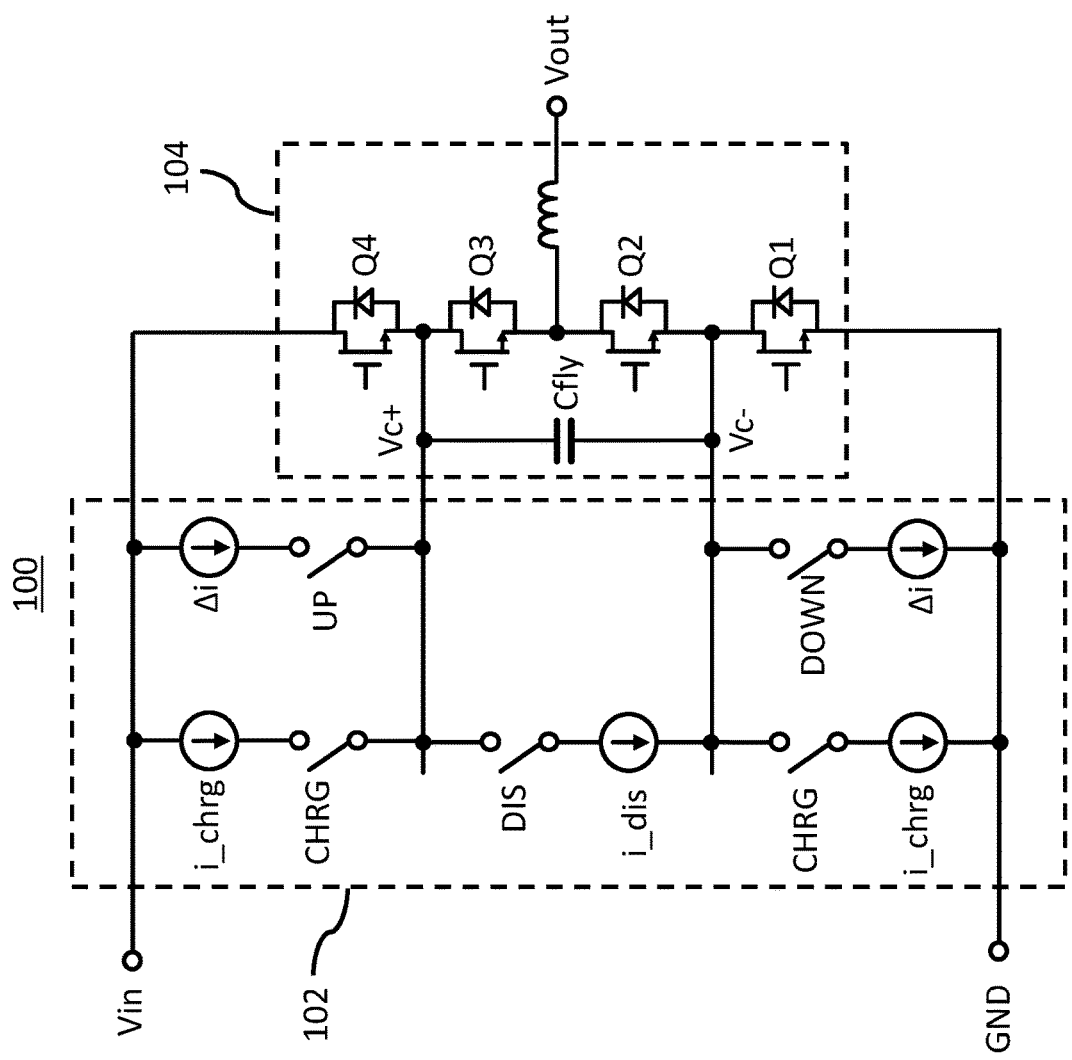
FIG. 2 is an example diagram of a flying capacitor startup circuit for multi-level voltage converters in one embodiment.

FIG. 2 is an example diagram of a flying capacitor startup circuit for multi-level voltage converters in one embodiment. In an embodiment shown in FIG. 2, circuit 102 can include a plurality of switched current sources i_chrg, i_dis, and Δi. Current source i_chrg can be switched by a switch labeled as CHRG, current source i_dis can be switched by a switch labeled as DIS, and current source Δi can be switched by switches labeled as UP and DOWN.

Circuit 102 can perform a pulse mode algorithm to control the flying capacitor voltage across flying capacitor Cfly. If the flying capacitor voltage is determined to be low (the determination will be described below), then switch CHRG can be enabled and current i_chrg can be applied at nodes Vc+ and Vc− to increase the flying capacitor voltage across Cfly until it reaches a target of Vin/2. Node Vc+ can be connected to a positive terminal of Cfly and node Vc− can be connected to a negative terminal of Cfly. If the flying capacitor voltage is determined to be high (the determination will be described below), then switch DIS can be enabled and current i_dis can be applied at nodes Vc+ and Vc− to decrease the flying capacitor voltage across Cfly until it reaches the target of Vin/2. In response to the flying capacitor voltage reaching Vin/2, or reaching a value close to Vin/2, circuit 102 automatically goes into a low current sleep mode to preserve power.

To avoid conducting current through body diodes of transistors Q1, Q2, Q3, Q4, current source Δi can be switched to control a common-mode voltage of flying capacitor Cfly based on Vout. If Vout is less than Vin/2, then switch DOWN can be enabled and current Δi can be applied to node Vc− to pull Vc−, or the negative terminal of Cfly, down to GND while Vc+, or the positive terminal of Cfly, is charged or discharged to Vin/2. If Vout is greater than Vin/2, switch UP can be enabled and Δi can be applied to node Vc+ to pull Vc+, or the positive terminal of Cfly, to Vin while node Vc−, or the negative terminal of Cfly, is pulled up or down to Vin/2.

Figure 3:
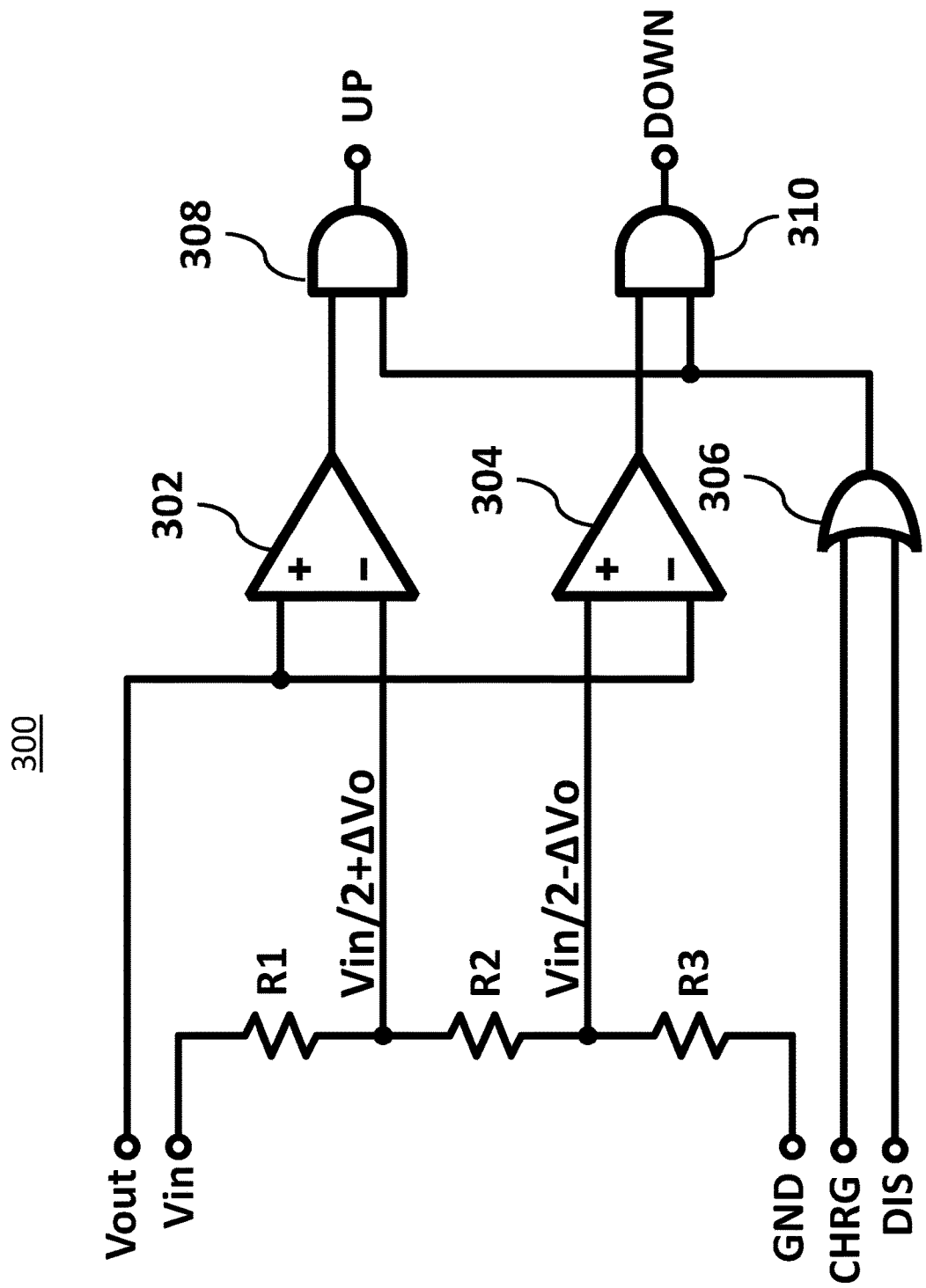
FIG. 3 is an example diagram of a circuit for controlling a common-mode voltage of a flying capacitor in a multi-level voltage converter in one embodiment.

FIG. 3 is an example diagram of a circuit 300 for controlling a common-mode voltage of a flying capacitor in a multi-level voltage converter in one embodiment. Circuit 300 can be a circuit block in circuit 102 shown in FIG. 1A to FIG. 2. Circuit 300 can include resistors R1, R2, R3, comparators 302, 304, OR gate 306, and AND gates 308, 310. Circuit 300 can receive input voltage Vin. Resistor R1 can scale input voltage Vin to generate a first scaled voltage (Vin/2)+ΔVo, where ΔVo is a voltage offset. Resistor R2 can further scale the first scaled voltage (Vin/2)+ΔVo to a second scaled voltage (Vin/2)−ΔVo.

A non-inverting input of comparator 302 can receive output voltage Vout, and an inverting input of comparator 302 can receive the first scaled voltage (Vin/2)+ΔVo. Comparator 302 can compare Vout with the first scaled voltage (Vin/2)+ΔVo and if Vout reaches the first scaled voltage (Vin/2)+ΔVo, then signal UP can be set to HIGH to enable switch UP of circuit 102 shown in FIG. 2. A non-inverting input of comparator 304 can receive the second scaled (Vin/2)−ΔVo and an inverting input of comparator 304 can receive output voltage Vout. Comparator 304 can compare Vout with the second scaled voltage (Vin/2)−ΔVo and if Vout reaches the second scaled voltage (Vin/2)−ΔVo, then signal DOWN can be set to HIGH to enable switch DOWN of circuit 102 shown in FIG. 2.

If output voltage Vout is between the first scaled voltage (Vin/2)+ΔVo and the second scaled voltage (Vin/2)−ΔVo, then neither UP or DOWN signal is set HIGH and the common-mode voltage will depend on a mismatch of pull-up and pull-down currents. Further, when circuit 102 is disabled, the signals CHRG and DIS can be zero, hence OR gate 306 can output a zero. Since the output of OR gate 306 is zero, AND gates 308, 310 will also output zeroes and the signals UP and DOWN will be set to LOW regardless of the outputs of comparators 302, 304.

Figure 4:
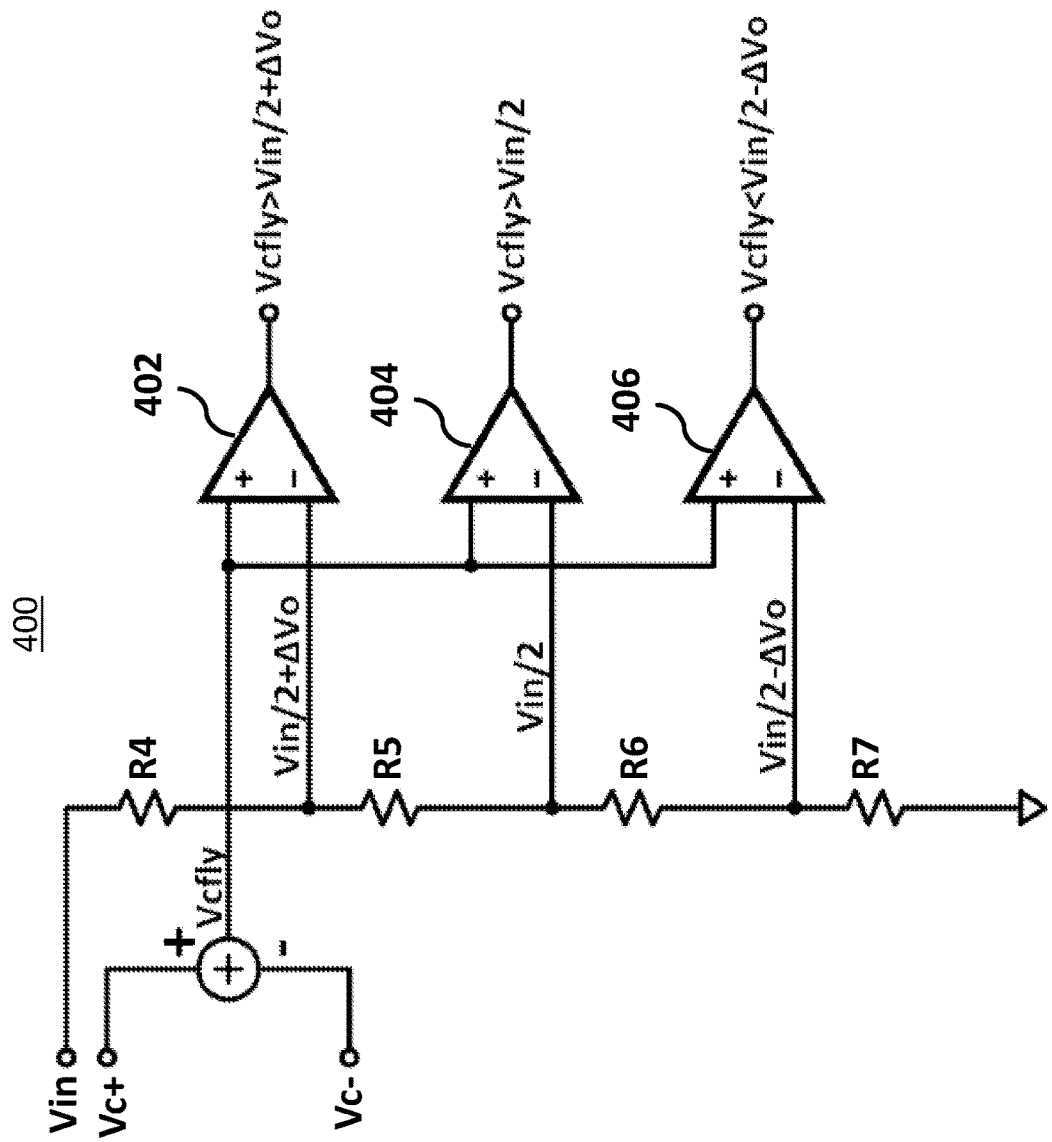
FIG. 4 is an example diagram of a circuit for controlling a flying capacitor voltage in a hysteretic mode in one embodiment.

FIG. 4 is an example diagram of a circuit 400 for controlling a flying capacitor voltage in a hysteretic mode in one embodiment. Circuit 400 can be a circuit block in circuit 102 (shown in FIG. 1A to FIG. 2) that can be implemented when circuit 102 is in a hysteretic mode, where the hysteretic mode is when sleep mode of circuit 102 is disabled. Circuit 400 can include a resistors R4, R5, R6, R7 and comparators 402, 404, 406. A flying capacitor voltage Vcfly can be measured from nodes Vc+ and Vc− (see FIG. 2). Circuit 400 can receive Vin and resistor R4 can scale Vin to the first scaled voltage (Vin/2)+ΔVo. Resistor R5 can further scale the first scaled voltage (Vin/2)+ΔVo to Vin/2. Resistor R6 can further scale Vin/2 to the second scaled voltage (Vin/2)−ΔVo. The non-inverting inputs of comparators 402, 404, 406 can receive Vcfly. Inverting input of comparator 402 can receive the first scaled voltage (Vin/2)+ΔVo. Inverting input of comparator 404 can receive Vin/2. Inverting input of comparator 406 can receive the second scaled voltage (Vin/2)−ΔVo. Output of comparator 402 can be connected to the switch DIS shown in FIG. 2 and output of comparator 406 can be connected to the switch CHRG shown in FIG. 2. In one embodiment, output of comparator 404 can cause circuit 102 (see FIG. 1A to FIG. 2) to be enabled or disabled. By way of example, if Vcfly is equivalent to Vin/2, or is within a predetermined tolerance percentage from Vin/2, then the output from comparator 404 can disable circuit 102 and put circuit 102 into a low current sleep mode.

Circuit 400 can perform a pulse mode algorithm to control the flying capacitor voltage Vcfly by determining whether to charge or discharge flying capacitor Cfly. In one embodiment, Vcfly can be determined as being low when Vcfly reaches the second scaled voltage (Vin/2)−ΔVo. If Vcfly reaches the second scaled voltage (Vin/2)−ΔVo, comparator 406 can output a voltage to set CHRG to HIGH such that switch CHRG can be enabled. When switch CHRG is enabled, flying capacitor Cfly can be charged by current source i_chrg (see FIG. 2). In one embodiment, Vcfly can be determined as being high when Vcfly reaches the first scaled voltage (Vin/2)+ΔVo. If Vcfly reaches the first scaled voltage (Vin/2)+ΔVo, comparator 402 can output a voltage to set DIS to HIGH such that switch DIS can be enabled. When switch DIS is enabled, flying capacitor Cfly can be discharged via current source i_dis (see FIG. 2). Circuit 400 can continue to monitor and measure Vcfly from nodes Vc+ and Vc− as flying capacitor Cfly is being charged or discharged. In response to Vcfly reaching Vin/2, or reaching a value close to Vin/2, the output from comparator 404 can trigger a monitor mode where circuit 102 continues to monitor Vcfly until Vcfly reaches the first scaled voltage (Vin/2)+ΔVo or the second scaled voltage (Vin/2)−ΔVo.

Figure 5:
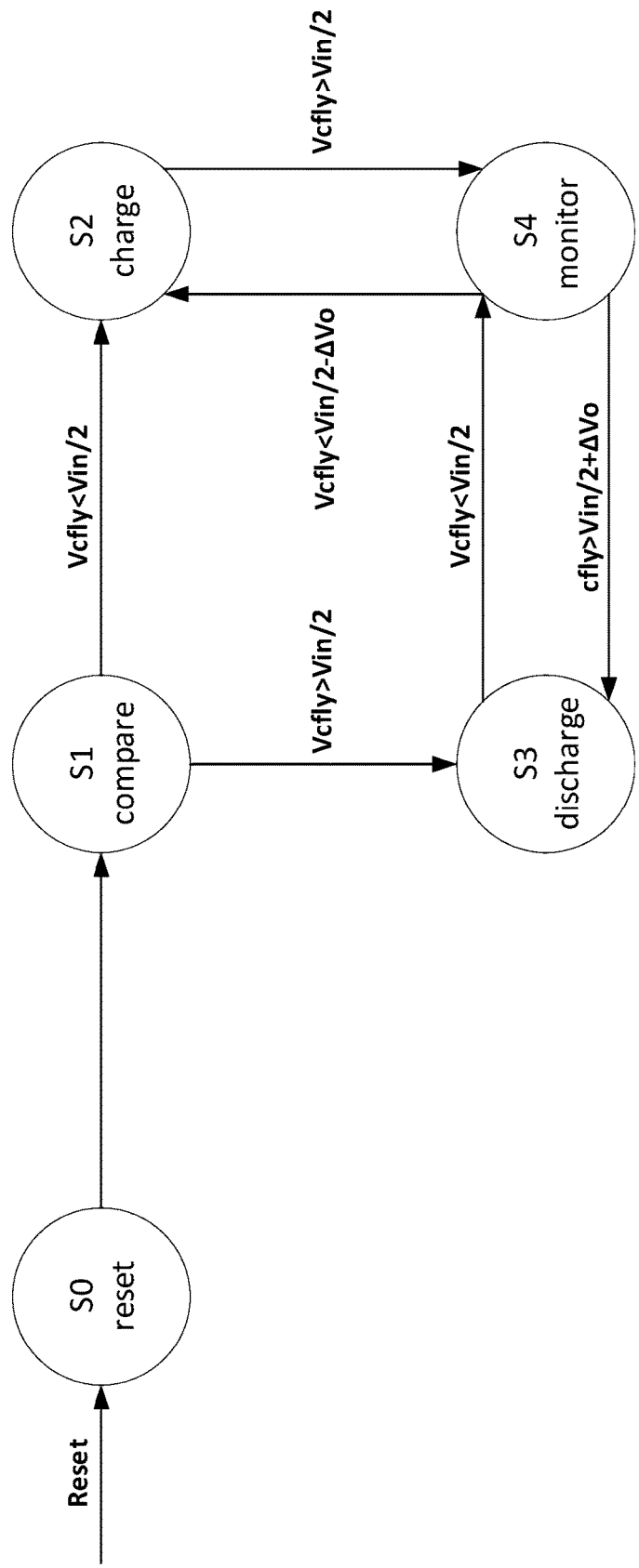
FIG. 5 is an example state diagram showing operations of a flying capacitor startup circuit in a hysteretic mode in one embodiment.

FIG. 5 is an example state diagram 500 showing operations of a flying capacitor startup circuit in a hysteretic mode in one embodiment. State diagram 500 can include states S0, S1, S2, S3, and S4. State S0 can be an initial state where circuit 102 (see FIG. 1A to FIG. 2) starts up or is being reset. State S0 can transition to state S1. At state S1, circuit 102 (e.g., or circuit 400 shown in FIG. 4) can compare flying capacitor voltage Vcfly with Vin/2. In response to Vcfly being less than Vin/2, state S1 can transition to state S2. In response to Vcfly being greater than Vin/2, state S1 can transition to state S3.

At state S2, circuit 102 can charge flying capacitor Cfly (see FIG. 1A to FIG. 2). Note that Vcfly being less than Vin/2 can indicate that flying capacitor Cfly needs to be charged to increase Vcfly to Vin/2. Referring to FIG. 2, Cfly can be charged by enabling switch CHRG to switch in current source i_chrg. In response to Vcfly being increased to Vin/2, state S2 can transition to state S4. At state S3, circuit 102 can discharge flying capacitor Cfly. Note that Vcfly being greater than Vin/2 can indicate that flying capacitor Cfly needs to be discharged to decrease Vcfly to Vin/2. Referring to FIG. 2, Cfly can be discharged by enabling switch DIS to switch in current source i_dis. In response to Vcfly being decreased to Vin/2, state S3 can transition to state S4.

At state S4, circuit 102 can continue to monitor Vcfly and determine whether to continuing charging or discharging Cfly. At state S4, if Vcfly decreases to the second scaled voltage (Vin/2)−ΔVo, then state S4 can transition back to state S2 to charge Cfly. At state S4, if Vcfly increases to the first scaled voltage (Vin/2)+ΔVo, then state S4 can transition back to state S3 to discharge Cfly. At state S4 CHRG and DIS are both set low, and the charging current (i_chrg) and the discharging current (i_dis) are both off.

Figure 6A:
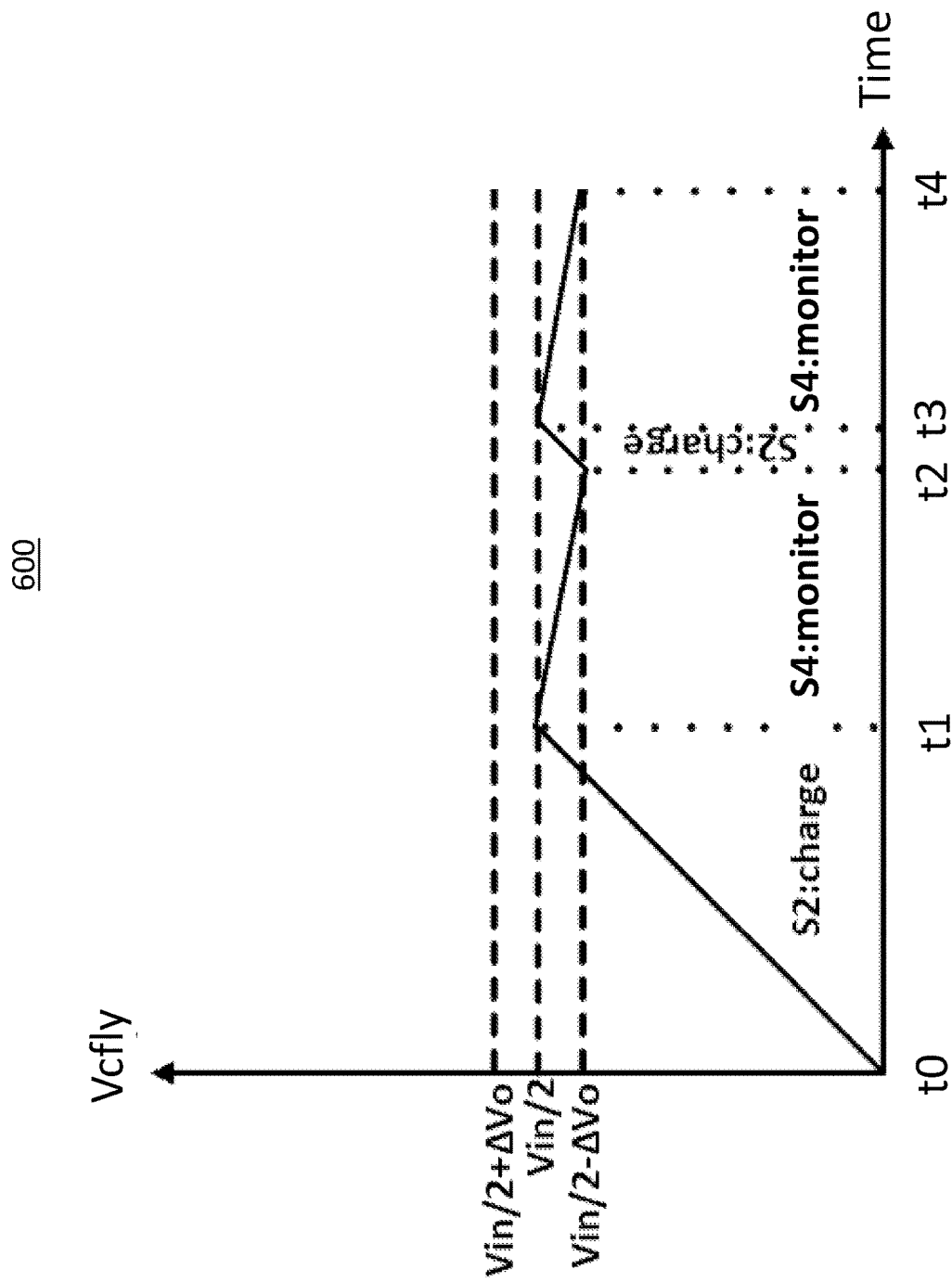
FIG. 6A is an example diagram showing a flying capacitor voltage during a hysteretic mode of a flying capacitor startup circuit for multi-level voltage converters in one embodiment.

FIG. 6A is an example diagram showing a flying capacitor voltage during a hysteretic mode of a flying capacitor startup circuit for multi-level voltage converters in one embodiment. A waveform 600 is shown in FIG. 6A and waveform 600 corresponds to the hysteretic mode implementation of state diagram 500 in FIG. 5. Waveform 600 corresponds to scenarios where the flying capacitor Cfly is fully discharged (e.g., Vcfly is zero or close to zero) during a startup of circuit 102 (see FIG. 1A to FIG. 2) at a time t0. Since flying capacitor Cfly is fully discharged at time t0, circuit 102 can switch current source i_chrg to charge flying capacitor Cfly. Flying capacitor Cfly can be charged until Vcfly reaches Vin/2 (or close to Vin/2).

In response to Vcfly reaching Vin/2 at time t1, circuit 102 can continue to monitor Vcfly until Vcfly decreases to the second scaled voltage (Vin/2)−ΔVo. In an aspect, flying capacitor voltage Vcfly can vary, such as increase or decrease due to various variations (e.g., temperature, environmental, leakage current). In waveform 600, in response to Vcfly decreasing to the second scaled voltage (Vin/2)−ΔVo at time t2, circuit 102 can charge Cfly until Vcfly reaches Vin/2 at t3. In response to Vcfly reaching Vin/s at time t3, circuit 102 can continue to monitor Vcfly until Vcfly decreases to the second scaled voltage (Vin/2)−ΔVo again.

Figure 6B:
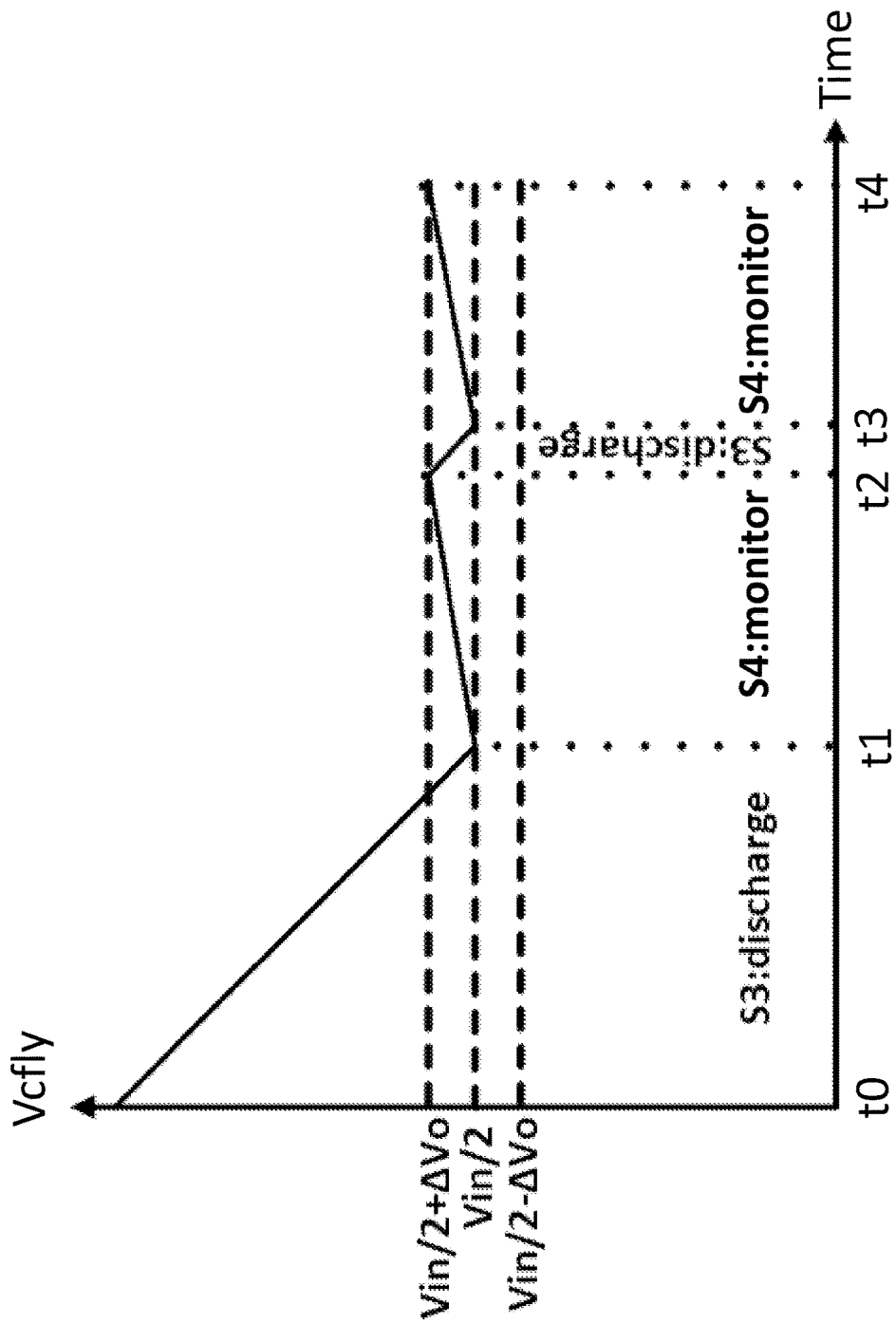
FIG. 6B is another example diagram showing a flying capacitor voltage during operation of a flying capacitor startup circuit for multi-level voltage converters in one embodiment.

FIG. 6B is another example diagram showing a flying capacitor voltage during a hysteretic mode of a flying capacitor startup circuit for multi-level voltage converters in one embodiment. A waveform 610 is shown in FIG. 6B and waveform 610 corresponds to the hysteretic mode implementation of state diagram 500 in FIG. 5. Waveform 610 corresponds to scenarios where the flying capacitor Cfly is fully charged during a startup of circuit 102 (see FIG. 1A to FIG. 2) at a time t0. Since flying capacitor Cfly is fully charged at time t0, circuit 102 can switch current source i_dis to discharge flying capacitor Cfly. Flying capacitor Cfly can be discharged until Vcfly reaches Vin/2 (or close to Vin/2).

In response to Vcfly reaching Vin/2 at time t1, circuit 102 can continue to monitor Vcfly until Vcfly increases to the first scaled voltage (Vin/2)+ΔVo. In an aspect, flying capacitor Cfly can vary, such as increase or decrease due to various variations (e.g., temperature, environmental, leakage current). In waveform 610, in response to Vcfly increasing to the first scaled voltage (Vin/2)+ΔVo at time t2, circuit 102 can discharge Cfly until Vcfly reaches Vin/2 at t3. In response to Vcfly reaching Vin/s at time t3, circuit 102 can continue to monitor Vcfly until Vcfly increases to the first scaled voltage (Vin/2)+ΔVo again. The voltage offset Vo can impose voltage window that varies between (Vin/2)−Vo and (Vin/2)+Vo to bound a value of Vcfly.

In one embodiment, the voltage offset ΔVo can be programmable and can vary with an amount of tolerable leakage voltage ripple. If relatively large voltage ripple is tolerable, then ΔVo can be programmed to be higher. If relatively small voltage ripple is tolerable, then Vo can be programmed to be lower. Setting ΔVo higher when more voltage ripple is tolerable can preserve power since circuit 102 can be enabled less frequently.

Figure 7:
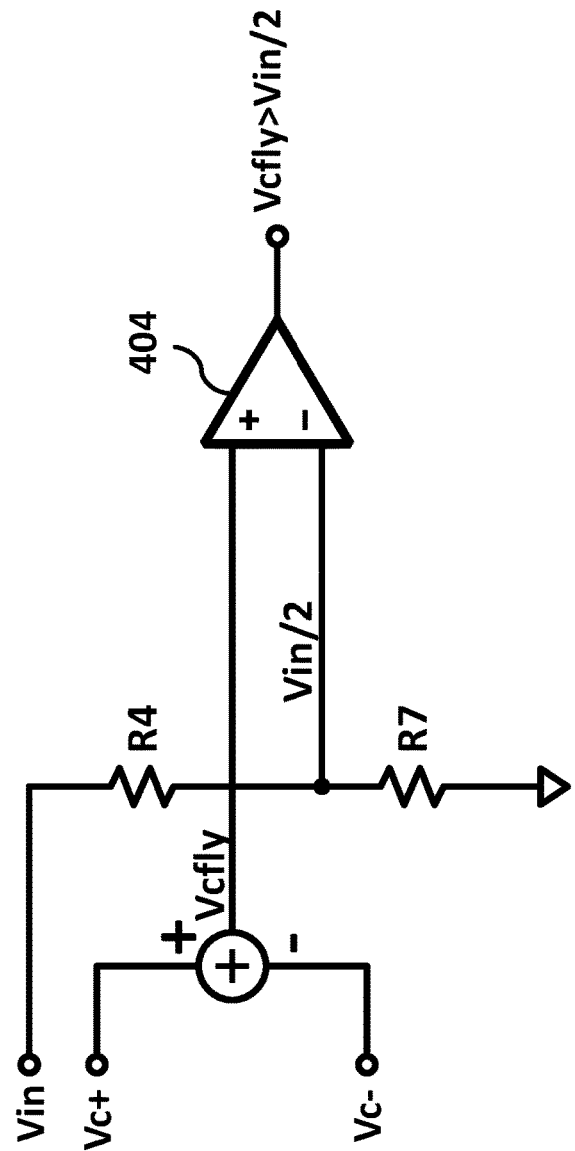
FIG. 7 is an example diagram of a circuit 700 for controlling a flying capacitor voltage in a constant-off time mode in one embodiment.

FIG. 7 is an example diagram of a circuit 700 for controlling a flying capacitor voltage in a constant-off time mode in one embodiment. Circuit 700 can be a circuit block in circuit 102 (shown in FIG. 1A to FIG. 2) that can be implemented when circuit 102 is in a constant-off time mode, where the constant-off time mode is when sleep mode of circuit 102 is enabled. In one embodiment, circuit 700 can be a part of circuit 400 shown in FIG. 4. In one embodiment, circuit 102 can include a register configured to store a register bit indicating whether circuit 400 shall operate in hysteretic mode or constant-off time mode (e.g., constant-off time mode of circuit 400 is implemented by circuit 700). The modes can be selected by changing the register bit such that, for example, if the register bit is set to '1' then the constant off-time mode is active or enabled, and if the register bit is set to '0' then the hysteretic mode is active or enabled.

In one embodiment, when the register bit is set to '1' to enable constant-off time mode, some components such as resistors R5, R6 and comparators 402, 406 of circuit 400 can be disconnected and the remaining connected components can implement circuit 700. As shown in FIG. 7, circuit 700 can include resistors R4, R7 and comparator 404. The non-inverting input of comparator 404 can receive Vcfly and the inverting input of comparator 404 can receive Vin/2. Output of comparator output of comparator 404 can cause circuit 102 (see FIG. 1A to FIG. 2) to enter or exit sleep mode. By way of example, if Vcfly is equivalent to Vin/2, or is within a predetermined tolerance percentage from Vin/2, then the output from comparator 404 can put circuit 102 into a low current sleep mode where all components are shut down except for a timer in circuit 102. Output of comparator 404 can also be connected to a timer to trigger a start of the timer, where the timer can be programmed to a predetermined amount of time.

Circuit 700 can perform a pulse mode algorithm to control the flying capacitor voltage Vcfly by determining whether to charge or discharge flying capacitor Cfly. In one embodiment, Vcfly can be determined as being low when Vcfly falls below Vin/2 for the predetermined amount of time, and can be determined as being high when Vcfly is above Vin/2 for the predetermined amount of time. Circuit 700 can monitor and measure Vcfly from nodes Vc+ and Vc− as flying capacitor Cfly is being charged or discharged. In response to Vcfly reaching Vin/2, or reaching a value close to Vin/2, the output from comparator 404 can cause circuit 102 to go into a low current sleep mode to preserve power and to start the timer in circuit 102. When the timer expires, circuit 700 can measure Vcfly again to determine whether Cfly needs to be charged or discharged.

Figure 8:
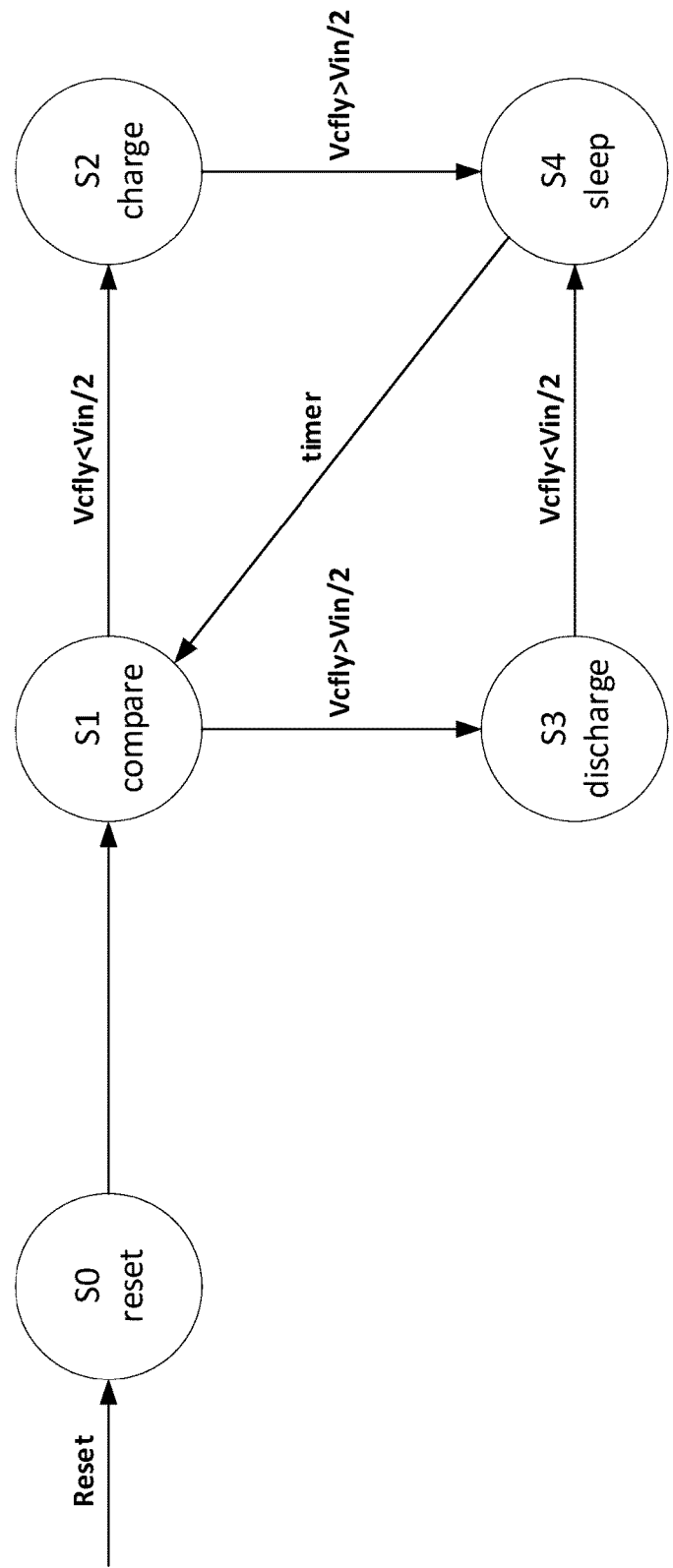
FIG. 8 is an example state diagram 800 showing operations of a flying capacitor startup circuit in a constant-off time mode in one embodiment.

FIG. 8 is an example state diagram 800 showing operations of a flying capacitor startup circuit in a constant-off time mode in one embodiment. State diagram 800 can include states S0, S1, S2, S3, and S4. State S0 can be an initial state where circuit 102 (see FIG. 1A to FIG. 2) starts up or is being reset. State S0 can transition to state S1. At state S1, circuit 102 (e.g., or circuit 400 shown in FIG. 4) can compare flying capacitor voltage Vcfly with Vin/2. In response to Vcfly being less than Vin/2, state S1 can transition to state S2. In response to Vcfly being greater than Vin/2, state S1 can transition to state S3.

At state S2, circuit 102 can charge flying capacitor Cfly (see FIG. 1A to FIG. 2). Note that Vcfly being less than Vin/2 can indicate that flying capacitor Cfly needs to be charged to increase Vcfly to Vin/2. Referring to FIG. 2, Cfly can be charged by enabling switch CHRG to switch in current source i_chrg. In response to Vcfly being increased to Vin/2, state S2 can transition to state S4. At state S3, circuit 102 can discharge flying capacitor Cfly. Note that Vcfly being greater than Vin/2 can indicate that flying capacitor Cfly needs to be discharged to decrease Vcfly to Vin/2. Referring to FIG. 2, Cfly can be discharged by enabling switch DIS to switch in current source i_dis. In response to Vcfly being decreased to Vin/2, state S3 can transition to state S4.

At state S4, circuit 102 be put into a sleep mode where all components of circuit 102 can be disabled except for a timer programmed to a predetermined amount of time. At state S4, in response to the timer expiring (or a lapse of the predetermined amount of time), state S4 can transition back to state S1 to enable circuit 102 for comparing Vcfly with Vin/2.

Figure 9A:
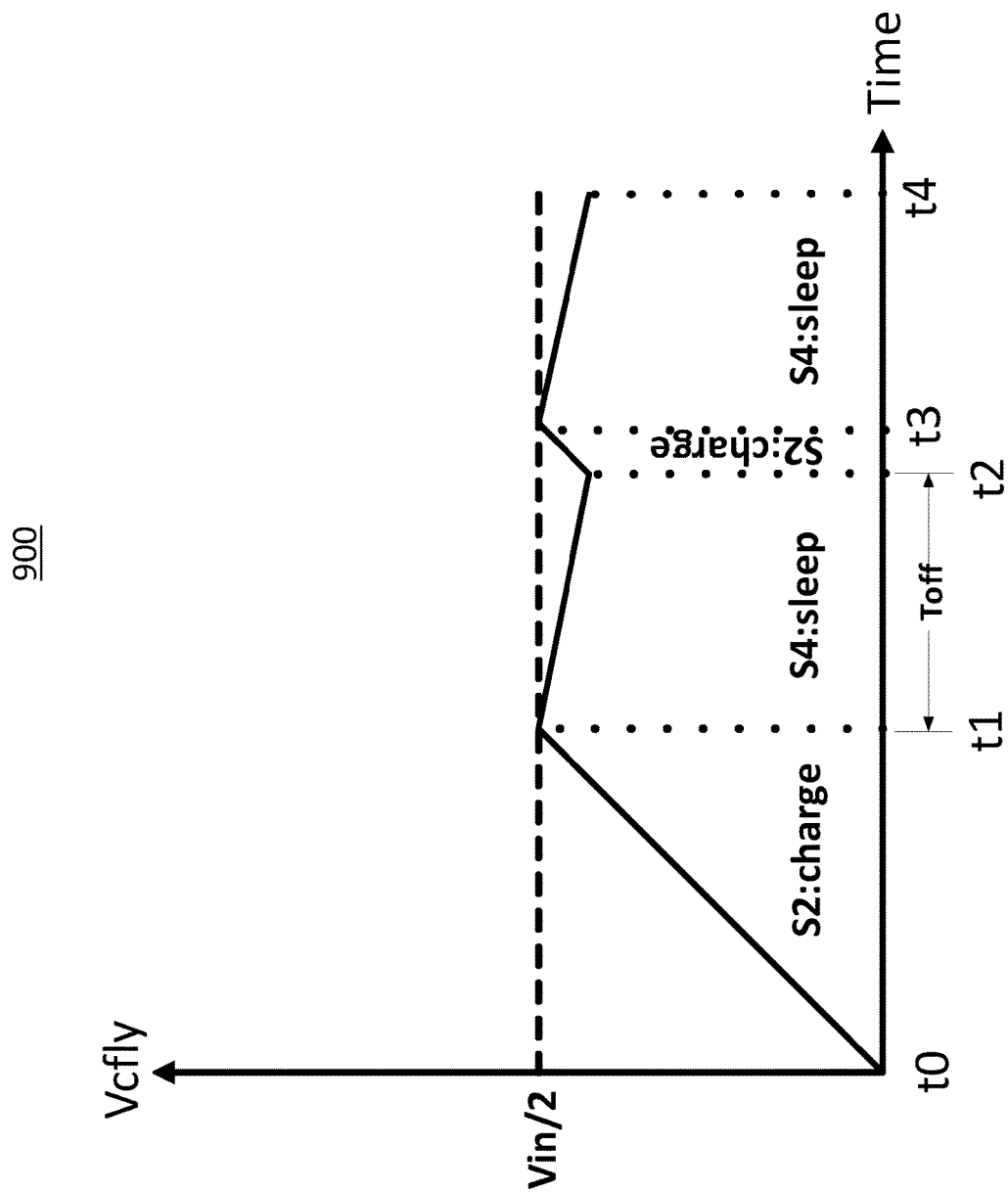
FIG. 9A is an example diagram showing a flying capacitor voltage during a constant-off time mode of a flying capacitor startup circuit for multi-level voltage converters in one embodiment.

FIG. 9A is an example diagram showing a flying capacitor voltage during a constant-off time mode of a flying capacitor startup circuit for multi-level voltage converters in one embodiment. A waveform 900 is shown in FIG. 9A and waveform 900 corresponds to the constant-off time mode implementation of state diagram 800 in FIG. 8. Waveform 900 corresponds to scenarios where the flying capacitor Cfly is fully discharged (e.g., Vcfly is zero or close to zero) during a startup of circuit 102 (see FIG. 1A to FIG. 2) at a time t0. Since flying capacitor Cfly is fully discharged at time t0, circuit 102 can switch current source i_chrg to charge flying capacitor Cfly. Flying capacitor Cfly can be charged until Vcfly reaches Vin/2 (or close to Vin/2).

In response to Vcfly reaching Vin/2 at time t1, circuit 102 can go into sleep mode for a predetermined amount of time labeled as Toff. When circuit 102 is in sleep mode, flying capacitor voltage Vcfly can vary, such as increase or decrease due to various variations (e.g., temperature, environmental, leakage current). After a lapse of Toff, such as at a time t2, circuit 102 can be enabled again and measure Vcfly to determine whether flying capacitor Cfly needs to be charged or discharged. In the example shown by waveform 900, circuit 102 can charge Cfly at time t2 and Vcfly can reach Vin/2 at time t3. Hence, at time t3, circuit 102 can go into sleep mode again until the lapse of Toff ends at time t4.

Figure 9B:
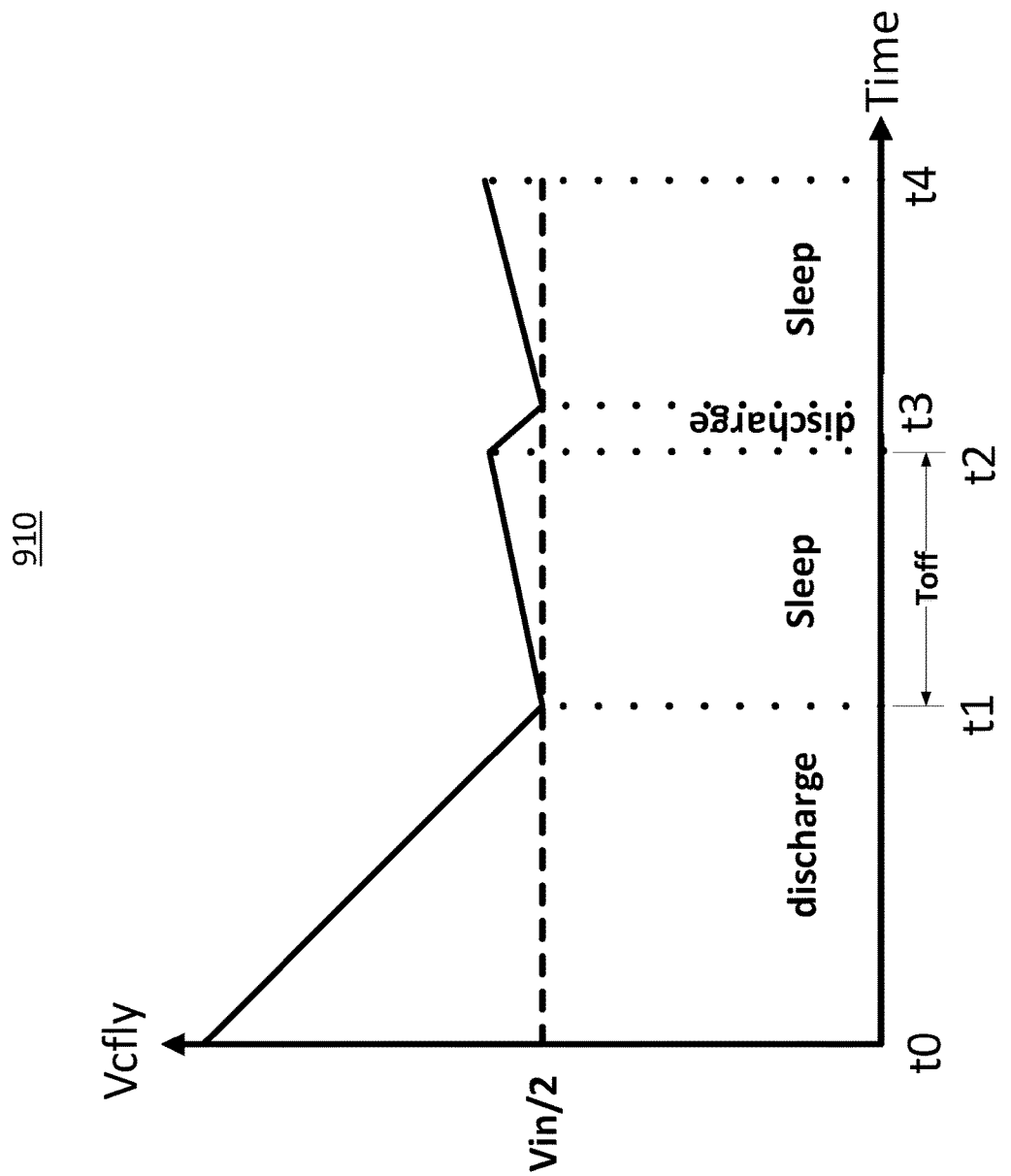
FIG. 9B is another example diagram showing a flying capacitor voltage during a constant-off time mode of a flying capacitor startup circuit for multi-level voltage converters in one embodiment.

FIG. 9B is another example diagram showing a flying capacitor voltage during a constant-off-time mode of a flying capacitor startup circuit for multi-level voltage converters in one embodiment. A waveform 910 is shown in FIG. 9B and waveform 910 corresponds to the constant off-time mode implementation of state diagram 800 in FIG. 8. Waveform 910 corresponds to scenarios where the flying capacitor Cfly is fully charged during a startup of circuit 102 (see FIG. 1A to FIG. 2) at a time t0. Since flying capacitor Cfly is fully charged at time t0, circuit 102 can switch current source i_dis to discharge flying capacitor Cfly. Flying capacitor Cfly can be discharged until Vcfly reaches Vin/2 (or close to Vin/2).

In response to Vcfly reaching Vin/2 at time t1, circuit 102 can go into sleep mode for a predetermined amount of time labeled as Toff. When circuit 102 is in sleep mode, flying capacitor voltage Vcfly can vary, such as increase or decrease due to various variations (e.g., temperature, environmental, leakage current). After a lapse of Toff, such as at a time t2, circuit 102 can be enabled again and measure Vcfly to determine whether flying capacitor Cfly needs to be charge or discharged. In the example shown by waveform 900, circuit 102 can discharge Cfly at time t2 and Vcfly can reach Vin/2 at time t3. Hence, at time t3, circuit 102 can go into sleep mode again until the lapse of Toff ends at time t4.

In one embodiment, the predetermined amount of time Toff can be programmable. By way of example, Toff can vary with an amount of expected leakage current. If relatively small leakage current is expected, then Toff can be programmed to be higher. If relatively large leakage current is expected, then Toff can be programmed to be lower. Setting Toff higher when less leakage current is expected can preserve power since circuit 102 can be enabled less frequently.

Figure 10:
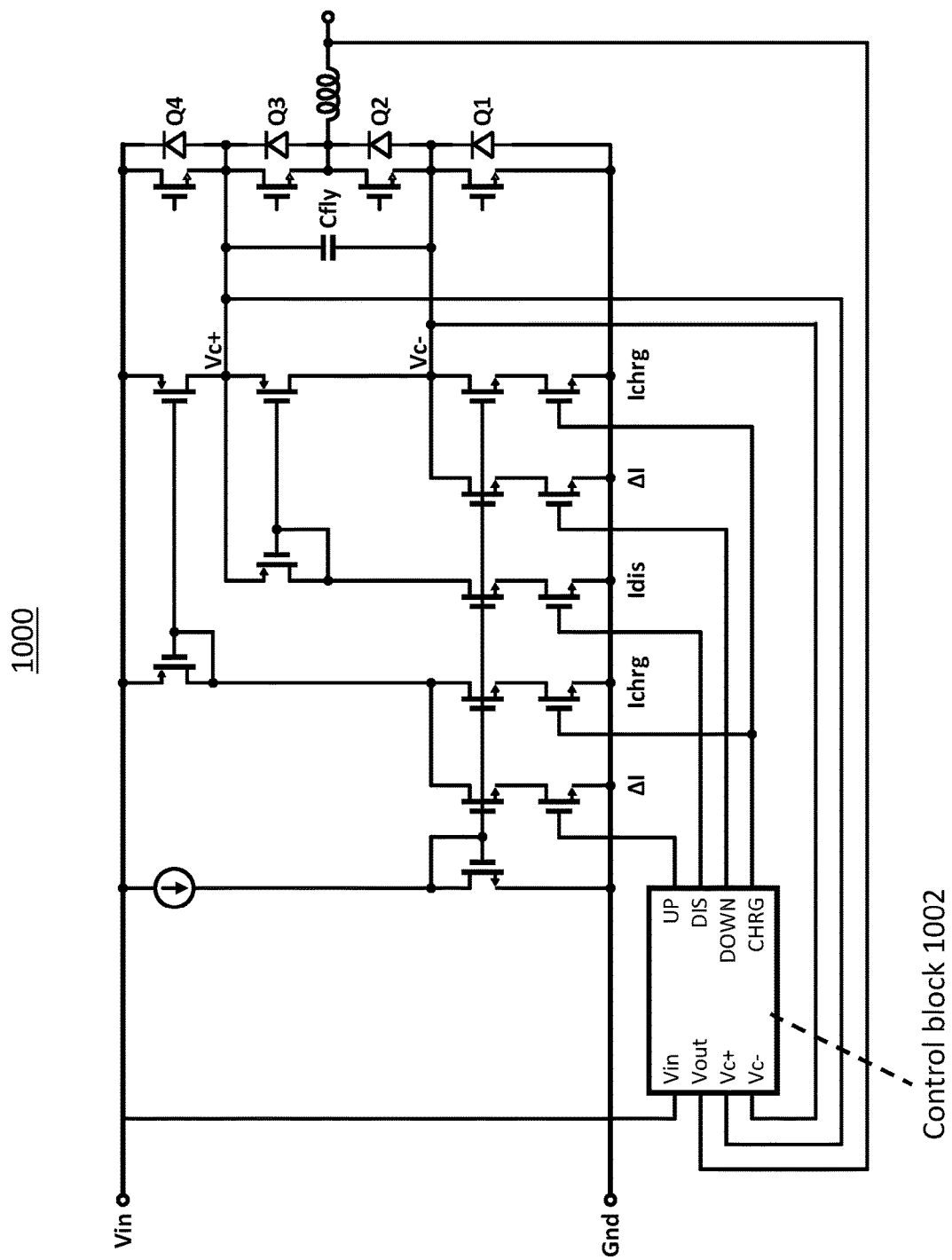
FIG. 10 is an example diagram of a circuit for implementing current sources in a flying capacitor startup circuit for multi-level voltage converters in one embodiment.

FIG. 10 is an example diagram of a circuit 1000 for implementing current sources in a flying capacitor startup circuit for multi-level voltage converters in one embodiment. In an embodiment shown in FIG. 10, current sources such as i_chrg, i_dis, Δi, shown in FIG. 2, can be connected to node Vc+ and can be implemented as P-type metal-oxide-semiconductor (PMOS) current mirrors driven by ground reference switched N-type metal-oxide-semiconductor (NMOS current sources). The switches UP, DOWN, CHRG, DIS shown in FIG. 2 can be driven by a control block 702 that can be a low voltage control circuit block including comparators, timers, and digital logic. Control block 1002 can receive Vin, Vout, and voltages at nodes Vc+ and Vc− as inputs. In one embodiment, control block 1002 can include, for example, circuits 300, 400, 700 in FIG. 3 and FIG. 4, respectively.

FIG. 11 is a flow diagram illustrating a process to implement a flying capacitor startup circuit for multi-level voltage converters in one embodiment. The process can include one or more operations, actions, or functions as illustrated by one or more of blocks 1102, 1104, and/or 1106. Although illustrated as discrete blocks, various blocks can be divided into additional blocks, combined into fewer blocks, eliminated, performed in different order, or performed in parallel, depending on the desired implementation.

Process 1100 can be performed by a circuit (e.g., circuit 102 in FIG. 1) to operate a multi-level voltage converter. Process 1100 can begin at block 1102. At block 1102, the circuit can measure a flying capacitor voltage across a flying capacitor of a multi-level voltage converter. Process 1100 can proceed from block 1102 to block 1104. At block 1104, the circuit can compare the flying capacitor voltage with a voltage level equivalent to an intermediate voltage that is between ground and an input voltage being provided to the multi-level voltage converter. Process 1100 can proceed from block 1104 to block 1106. At block 1106, the circuit can switch a current source among the plurality of current sources to maintain the flying capacitor voltage at the intermediate voltage.

In one embodiment, in response to the flying capacitor voltage being lower than the intermediate voltage, the circuit can switch a first current source in the circuit to charge the flying capacitor. In response to the flying capacitor voltage being greater than the intermediate voltage, the circuit can switch a second current source in the circuit to discharge the flying capacitor.

In one embodiment, in response to the flying capacitor voltage being lower than the intermediate voltage, the circuit can switch a first current source in the circuit to charge the flying capacitor until the flying capacitor voltage reaches the intermediate voltage. In response to the flying capacitor voltage being greater than the intermediate voltage, the circuit can switch a second current source in the circuit to discharge the flying capacitor until the flying capacitor voltage reaches the intermediate voltage.

In one embodiment, in response to the flying capacitor voltage being lower than the intermediate voltage, the circuit can switch a first current source in the circuit to charge the flying capacitor until the flying capacitor voltage reaches the intermediate voltage. In response to the flying capacitor voltage being greater than the intermediate voltage, the circuit can switch a second current source in the circuit to discharge the flying capacitor until the flying capacitor voltage reaches the intermediate voltage. In response to the flying capacitor voltage reaching the intermediate voltage, the circuit can activate a sleep mode of the circuit. In response to a lapse of a predetermined amount of time, the circuit can deactivate the sleep mode of the circuit.

In one embodiment, in response to the flying capacitor voltage being lower than the intermediate voltage, switching a first current source in the circuit to charge the flying capacitor until the flying capacitor voltage reaches the intermediate voltage. In response to the flying capacitor voltage being greater than the intermediate voltage, the circuit can switch a second current source in the circuit to discharge the flying capacitor until the flying capacitor voltage reaches the intermediate voltage. In response to the flying capacitor voltage reaching the intermediate voltage, the circuit can activate a monitor mode to disconnect the first current source and the second current source from the flying capacitor. In response to the flying capacitor voltage reaching a lower bound of a predetermined voltage window, the circuit can switch the first current source in the circuit to charge the flying capacitor until the flying capacitor voltage reaches the intermediate voltage. In response to the flying capacitor voltage reaching an upper bound of a predetermined voltage window, the circuit can switch the second current source in the circuit to discharge the flying capacitor until the flying capacitor voltage reaches the intermediate voltage.

In one embodiment, the circuit can measure an output voltage of the multi-level voltage converter. The circuit can compare the output voltage with the intermediate voltage to determine whether the output voltage is greater than or less than the intermediate voltage. In response to the output voltage being less than the intermediate voltage, the circuit can switch a first current source in the circuit to pull a voltage at a negative terminal of the flying capacitor to ground and to pull a positive terminal of the flying capacitor to the intermediate voltage. In response to the output voltage being greater than the intermediate voltage, the circuit can switch a second current source in the circuit to pull a voltage at a negative terminal of the flying capacitor to the intermediate voltage and to pull a positive terminal of the flying capacitor to the input voltage.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
    a circuit including a plurality of current sources, the circuit being configured to:
        measure a flying capacitor voltage across a flying capacitor of a multi-level voltage converter;
        compare the flying capacitor voltage with a voltage level equivalent to an intermediate voltage that is between ground and an input voltage being provided to the multi-level voltage converter; and
        based on a result of the comparison, switch a current source among the plurality of current sources to maintain the flying capacitor voltage at the intermediate voltage.

2. The semiconductor device of claim 1, wherein the circuit is configured to:
    in response to the flying capacitor voltage being lower than the intermediate voltage, switch a first current source in the circuit to charge the flying capacitor; and
    in response to the flying capacitor voltage being greater than the intermediate voltage, switch a second current source in the circuit to discharge the flying capacitor.

3. The semiconductor device of claim 1, wherein the circuit is configured to:
in response to the flying capacitor voltage being lower than the intermediate voltage, switch a first current source in the circuit to charge the flying capacitor until the flying capacitor voltage reaches the intermediate voltage; and
in response to the flying capacitor voltage being greater than the intermediate voltage, switch a second current source in the circuit to discharge the flying capacitor until the flying capacitor voltage reaches the intermediate voltage.

4. The semiconductor device of claim 1, wherein in response to the circuit operating under a constant-off time mode, the circuit is configured to:
in response to the flying capacitor voltage being lower than the intermediate voltage, switch a first current source in the circuit to charge the flying capacitor until the flying capacitor voltage reaches the intermediate voltage;
in response to the flying capacitor voltage being greater than the intermediate voltage, switch a second current source in the circuit to discharge the flying capacitor until the flying capacitor voltage reaches the intermediate voltage;
in response to the flying capacitor voltage reaching the intermediate voltage, activate a sleep mode of the circuit; and
in response to a lapse of a predetermined amount of time, deactivate the sleep mode of the circuit.

5. The semiconductor device of claim 1, wherein in response to the circuit operating under a hysteretic mode, the circuit is configured to:
in response to the flying capacitor voltage being lower than the intermediate voltage, switch a first current source in the circuit to charge the flying capacitor until the flying capacitor voltage reaches the intermediate voltage;
in response to the flying capacitor voltage being greater than the intermediate voltage, switch a second current source in the circuit to discharge the flying capacitor until the flying capacitor voltage reaches the intermediate voltage;
in response to the flying capacitor voltage reaching the intermediate voltage, activate a monitor mode to disconnect the first current source and the second current source from the flying capacitor;
in response to the flying capacitor voltage reaching a lower bound of a predetermined voltage window, switch the first current source in the circuit to charge the flying capacitor until the flying capacitor voltage reaches the intermediate voltage; and
in response to the flying capacitor voltage reaching an upper bound of a predetermined voltage window, switch the second current source in the circuit to discharge the flying capacitor until the flying capacitor voltage reaches the intermediate voltage.

6. The semiconductor device of claim 1, wherein the circuit is further configured to:
measure an output voltage of the multi-level voltage converter;
compare the output voltage with the intermediate voltage to determine whether the output voltage is greater than or less than the intermediate voltage;
in response to the output voltage being less than the intermediate voltage, switch a first current source in the circuit to pull a voltage at a negative terminal of the flying capacitor to ground and to pull a positive terminal of the flying capacitor to the intermediate voltage; and
in response to the output voltage being greater than the intermediate voltage, switch a second current source in the circuit to pull a voltage at a negative terminal of the flying capacitor to the intermediate voltage and to pull a positive terminal of the flying capacitor to the input voltage.

7. The semiconductor device of claim 1, wherein the multi-level voltage converter is a three-level voltage converter, and the intermediate voltage is half of the input voltage.

8. A system comprising:
a multi-level voltage converter including a flying capacitor and a plurality of transistors;
a circuit including a plurality of current sources, the circuit being configured to:
measure a flying capacitor voltage across the flying capacitor of the multi-level voltage converter;
compare the flying capacitor voltage with a voltage level equivalent to an intermediate voltage that is between ground and an input voltage being provided to the multi-level voltage converter; and
based on a result of the comparison, switch a current source among the plurality of current sources to maintain the flying capacitor voltage at the intermediate voltage.

9. The system of claim 8, wherein the circuit is configured to:
in response to the flying capacitor voltage being lower than the intermediate voltage, switch a first current source in the circuit to charge the flying capacitor; and
in response to the flying capacitor voltage being greater than the intermediate voltage, switch a second current source in the circuit to discharge the flying capacitor.

10. The system of claim 8, wherein the circuit is configured to:
in response to the flying capacitor voltage being lower than the intermediate voltage, switch a first current source in the circuit to charge the flying capacitor until the flying capacitor voltage reaches the intermediate voltage; and
in response to the flying capacitor voltage being greater than the intermediate voltage, switch a second current source in the circuit to discharge the flying capacitor until the flying capacitor voltage reaches the intermediate voltage.

11. The system of claim 8, wherein in response to the circuit operating under a constant-off time mode, the circuit is configured to:
in response to the flying capacitor voltage being lower than the intermediate voltage, switch a first current source in the circuit to charge the flying capacitor until the flying capacitor voltage reaches the intermediate voltage;
in response to the flying capacitor voltage being greater than the intermediate voltage, switch a second current source in the circuit to discharge the flying capacitor until the flying capacitor voltage reaches the intermediate voltage;
in response to the flying capacitor voltage reaching the intermediate voltage, activate a sleep mode of the circuit; and
in response to a lapse of a predetermined amount of time, deactivate the sleep mode of the circuit.

12. The system of claim 8, wherein in response to the circuit operating under a hysteretic mode, the circuit is configured to:
- in response to the flying capacitor voltage being lower than the intermediate voltage, switch a first current source in the circuit to charge the flying capacitor until the flying capacitor voltage reaches the intermediate voltage;
- in response to the flying capacitor voltage being greater than the intermediate voltage, switch a second current source in the circuit to discharge the flying capacitor until the flying capacitor voltage reaches the intermediate voltage;
- in response to the flying capacitor voltage reaching the intermediate voltage, activate a monitor mode to disconnect the first current source and the second current source from the flying capacitor;
- in response to the flying capacitor voltage reaching a lower bound of a predetermined voltage window, switch the first current source in the circuit to charge the flying capacitor until the flying capacitor voltage reaches the intermediate voltage; and
- in response to the flying capacitor voltage reaching an upper bound of a predetermined voltage window, switch the second current source in the circuit to discharge the flying capacitor until the flying capacitor voltage reaches the intermediate voltage.

13. The system of claim 8, wherein the circuit is further configured to:
- measure an output voltage of the multi-level voltage converter;
- compare the output voltage with the intermediate voltage to determine whether the output voltage is greater than or less than the intermediate voltage;
- in response to the output voltage being less than the intermediate voltage, switch a first current source in the circuit to pull a voltage at a negative terminal of the flying capacitor to ground and to pull a positive terminal of the flying capacitor to the intermediate voltage; and
- in response to the output voltage being greater than the intermediate voltage, switch a second current source in the circuit to pull a voltage at a negative terminal of the flying capacitor to the intermediate voltage and to pull a positive terminal of the flying capacitor to the input voltage.

14. The system of claim 8, wherein the multi-level voltage converter is a three-level voltage converter, and the intermediate voltage is half of the input voltage.

15. A method for operating a multi-level voltage converter, the method comprising:
- measuring a flying capacitor voltage across a flying capacitor of a multi-level voltage converter;
- comparing the flying capacitor voltage with a voltage level equivalent to an intermediate voltage that is between ground and an input voltage being provided to the multi-level voltage converter; and
- based on a result of the comparison, switching a current source among a plurality of current sources in a circuit to maintain the flying capacitor voltage at the intermediate voltage.

16. The method of claim 15, further comprising:
- in response to the flying capacitor voltage being lower than the intermediate voltage, switching a first current source in the circuit to charge the flying capacitor; and
- in response to the flying capacitor voltage being greater than the intermediate voltage, switching a second current source in the circuit to discharge the flying capacitor.

17. The method of claim 15, further comprising:
- in response to the flying capacitor voltage being lower than the intermediate voltage, switching a first current source in the circuit to charge the flying capacitor until the flying capacitor voltage reaches the intermediate voltage; and
- in response to the flying capacitor voltage being greater than the intermediate voltage, switching a second current source in the circuit to discharge the flying capacitor until the flying capacitor voltage reaches the intermediate voltage.

18. The method of claim 15, further comprising:
- in response to the flying capacitor voltage being lower than the intermediate voltage, switching a first current source in the circuit to charge the flying capacitor until the flying capacitor voltage reaches the intermediate voltage;
- in response to the flying capacitor voltage being greater than the intermediate voltage, switching a second current source in the circuit to discharge the flying capacitor until the flying capacitor voltage reaches the intermediate voltage;
- in response to the flying capacitor voltage reaching the intermediate voltage, activating a sleep mode of the circuit; and
- in response to a lapse of a predetermined amount of time, deactivating the sleep mode of the circuit.

19. The method of claim 15, further comprising:
- in response to the flying capacitor voltage being lower than the intermediate voltage, switching a first current source in the circuit to charge the flying capacitor until the flying capacitor voltage reaches the intermediate voltage;
- in response to the flying capacitor voltage being greater than the intermediate voltage, switching a second current source in the circuit to discharge the flying capacitor until the flying capacitor voltage reaches the intermediate voltage;
- in response to the flying capacitor voltage reaching the intermediate voltage, activating a monitor mode to disconnect the first current source and the second current source from the flying capacitor;
- in response to the flying capacitor voltage reaching a lower bound of a predetermined voltage window, switching the first current source in the circuit to charge the flying capacitor until the flying capacitor voltage reaches the intermediate voltage; and
- in response to the flying capacitor voltage reaching an upper bound of a predetermined voltage window, switching the second current source in the circuit to discharge the flying capacitor until the flying capacitor voltage reaches the intermediate voltage.

20. The method of claim 15, further comprising:
- measuring an output voltage of the multi-level voltage converter;
- comparing the output voltage with the intermediate voltage to determine whether the output voltage is greater than or less than the intermediate voltage;
- in response to the output voltage being less than the intermediate voltage, switching a first current source in the circuit to pull a voltage at a negative terminal of the flying capacitor to ground and to pull a positive terminal of the flying capacitor to the intermediate voltage; and in response to the output voltage being greater than the intermediate voltage, switching a second current source in the circuit to pull a voltage at a negative terminal of the flying capacitor to the intermediate voltage and to pull a positive terminal of the flying capacitor to the input voltage.

* * * * *